(12) United States Patent
Kang et al.

(10) Patent No.: US 12,451,192 B2
(45) Date of Patent: Oct. 21, 2025

(54) NON-VOLATILE MEMORY DEVICE WITH HIGH VOLTAGE REGION AND LOW VOLTAGE REGION

(71) Applicant: SAMSUNG ELECTRONICS CO., LTD., Suwon-si (KR)

(72) Inventors: Inho Kang, Suwon-si (KR); Daeseok Byeon, Suwon-si (KR); Beakhyung Cho, Suwon-si (KR); Min-Hwi Kim, Suwon-si (KR); Yongsung Cho, Suwon-si (KR); Gyosoo Choo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 18/201,331

(22) Filed: May 24, 2023

(65) Prior Publication Data

US 2024/0105267 A1   Mar. 28, 2024

(30) Foreign Application Priority Data

Sep. 28, 2022  (KR) .......................... 10-2022-0123478

(51) Int. Cl.
  *G11C 16/24*  (2006.01)
  *G11C 16/04*  (2006.01)
  (Continued)

(52) U.S. Cl.
  CPC .......... *G11C 16/24* (2013.01); *G11C 16/0483* (2013.01); *H01L 24/08* (2013.01); *H01L 25/0657* (2013.01); *H01L 25/18* (2013.01); *H10B 41/41* (2023.02); *H10B 43/40* (2023.02); *H10B 80/00* (2023.02); *H01L 2224/08145* (2013.01); *H01L 2924/1431* (2013.01); *H01L 2924/14511* (2013.01)

(58) Field of Classification Search
  CPC .... G11C 16/24; G11C 16/0483; H10B 80/00; H10B 43/40; H10B 41/41
  USPC ...................................................... 365/185.18
  See application file for complete search history.

(56) References Cited

U.S. PATENT DOCUMENTS 10,324,629 B2   6/2019  Lee et al.
11,374,016 B2   6/2022  Oh et al.
(Continued)

OTHER PUBLICATIONS

Communication issued on Mar. 18, 2024 by the European Patent Office for European Patent Application No. 23180450.1.

*Primary Examiner* — Sung Il Cho
(74) *Attorney, Agent, or Firm* — Sughrue Mion, PLLC

(57) ABSTRACT

Provided is a non-volatile memory device including a page buffer circuit having a multi-stage structure, wherein a stage of the multi-stage structure includes a high voltage region, a first low voltage region, and a second low voltage region. The high voltage region includes a first high voltage transistor connected to one of first to sixth bit lines and a second high voltage transistor connected to one of seventh to twelfth bit lines, the first low voltage region includes a first transistor connected to the first high voltage transistor, and the second low voltage region includes a second transistor connected to the second high voltage transistor. Each of the first low voltage region and the second low voltage regions has a first width corresponding to a pitch of six bit lines, and the high voltage region has a second width corresponding to a pitch of twelve bit lines.

20 Claims, 23 Drawing Sheets

(51) Int. Cl.
    *H01L 23/00*     (2006.01)
    *H01L 25/065*     (2023.01)
    *H01L 25/18*     (2023.01)
    *H10B 41/41*     (2023.01)
    *H10B 43/40*     (2023.01)
    *H10B 80/00*     (2023.01)

(56) References Cited

U.S. PATENT DOCUMENTS

| | | | |
|---|---|---|---|
| 2009/0323432 A1* | 12/2009 | Futatsuyama | G11C 16/3454 |
| | | | 365/185.25 |
| 2018/0277225 A1* | 9/2018 | Park | G11C 11/5621 |
| 2021/0313288 A1* | 10/2021 | Oh | H01L 24/05 |
| 2022/0020404 A1 | 1/2022 | Cho et al. | |
| 2022/0122651 A1 | 4/2022 | Kim et al. | |
| 2022/0122932 A1 | 4/2022 | Oh et al. | |
| 2022/0139895 A1* | 5/2022 | Choi | H01L 25/18 |
| | | | 365/185.13 |
| 2022/0165744 A1 | 5/2022 | Kim et al. | |

* cited by examiner

NON-VOLATILE MEMORY DEVICE WITH HIGH VOLTAGE REGION AND LOW VOLTAGE REGION

CROSS-REFERENCE TO RELATED APPLICATION

This application is based on and claims priority under 35 U.S.C. § 119 to Korean Patent Application No. 10-2022-0123478, filed on Sep. 28, 2022, in the Korean Intellectual Property Office, the disclosure of which is incorporated herein by reference in its entirety.

BACKGROUND

1. Field

The present disclosure relates to a memory device, and more particularly, to a 3-dimensional non-volatile memory device including memory cell arrays arranged in a vertical direction with respect to a peripheral circuit.

2. Description of the Related Art

In response to the demand for increased capacity and miniaturization of non-volatile memory devices, a 3-dimensional non-volatile memory device including memory cell arrays and peripheral circuits arranged in a vertical direction has been developed. As the number of stacked word lines included in a memory cell array increases in conjunction with the development of semiconductor processes, the area of the memory cell array decreases. Therefore, reduction of the area of a peripheral circuit is desired, and, in particular, the demand for reducing the size of a page buffer that occupies a significant area in the peripheral circuit is increasing.

SUMMARY

The present disclosure provides a non-volatile memory with improved read reliability and reduced size of a page buffer circuit.

According to one or more embodiments, a non-volatile memory device comprises: a memory cell array comprising a plurality of memory cells in which each memory cell is connected to a respective bit line from a plurality of bit lines that extend in a first direction and comprises first to twelfth bit lines arranged in a second direction different from the first direction; and a page buffer circuit disposed below the memory cell array in a vertical direction different from the first direction and the second direction and having a multi-stage structure in the first direction, wherein a stage of the multi-stage structure comprises: a high voltage region comprising a first high voltage transistor connected to one of first to sixth bit lines from the plurality of bit lines and a second high voltage transistor connected to one of seventh to twelfth bit lines from the plurality of bit lines, a first low voltage region comprising a first transistor adjacent to the high voltage region in the first direction and connected to the first high voltage transistor, and a second low voltage region adjacent to the first low voltage region in the second direction and comprising a second transistor connected to the second high voltage transistor, wherein each of the first low voltage region and the second low voltage region has a first width corresponding to a pitch of six bit lines in the second direction, and wherein the high voltage region has a second width corresponding to a pitch of twelve bit lines in the second direction.

According to one or more embodiments, a non-volatile memory device comprising: a memory cell array comprising a plurality of memory cells in which each memory cell is connected to a respective bit line from to a plurality of bit lines that extend in a first direction and comprises first to eighth bit lines arranged in a second direction different from the first direction; and a page buffer circuit disposed below the memory cell array in a vertical direction different from the first direction and the second direction and having a multi-stage structure in the first direction, wherein a stage of the multi-stage structure comprises: a high voltage region comprising a first high voltage transistor connected to one of first to fourth bit lines from the plurality of bit lines and a second high voltage transistor connected to one of fifth to eighth bit lines from the plurality of bit lines; a first low voltage region comprising a first transistor adjacent to the high voltage region in the first direction and connected to the first high voltage transistor, and a second low voltage region adjacent to the first low voltage region in the second direction and comprising a second transistor connected to the second high voltage transistor, wherein each of the first low voltage region and the second low voltage regions has a first width corresponding to a pitch of four bit lines in the second direction, and wherein the high voltage region has a second width corresponding to a pitch of eight bit lines in the second direction.

According to one or more embodiments, a non-volatile memory device comprising: a first semiconductor layer comprising channel structures extending in a vertical direction, a plurality of bit lines connected to the channel structures and extending in a first direction, and a plurality of top bonding pads each connected to a respective bit line from the plurality of bit lines; and a second semiconductor layer comprising a plurality of bottom bonding pads and a page buffer circuit that has a multi-stage structure in the first direction and is connected to the first semiconductor layer in the vertical direction through the plurality of bottom bonding pads and the plurality of top bonding pads, wherein a stage of the multi-stage structure comprises: a high voltage region comprising a first high voltage transistor connected to one of the plurality of bit lines and a second high voltage transistor connected to another one of the plurality of bit lines, a first low voltage region comprising a first transistor adjacent to the high voltage region in the first direction and connected to the first high voltage transistor, and a second low voltage region adjacent to the first low voltage region in a second direction and comprising a second transistor connected to the second high voltage transistor, wherein each of the first low voltage region and the second low voltage region has a first width in the second direction, and wherein the high voltage region has a second width twice the first width in the second direction.

BRIEF DESCRIPTION OF DRAWINGS

Embodiments of the present disclosure will be more clearly understood from the following detailed description taken in conjunction with the accompanying drawings in which.

DETAILED DESCRIPTION OF EMBODIMENTS

Figure 1:
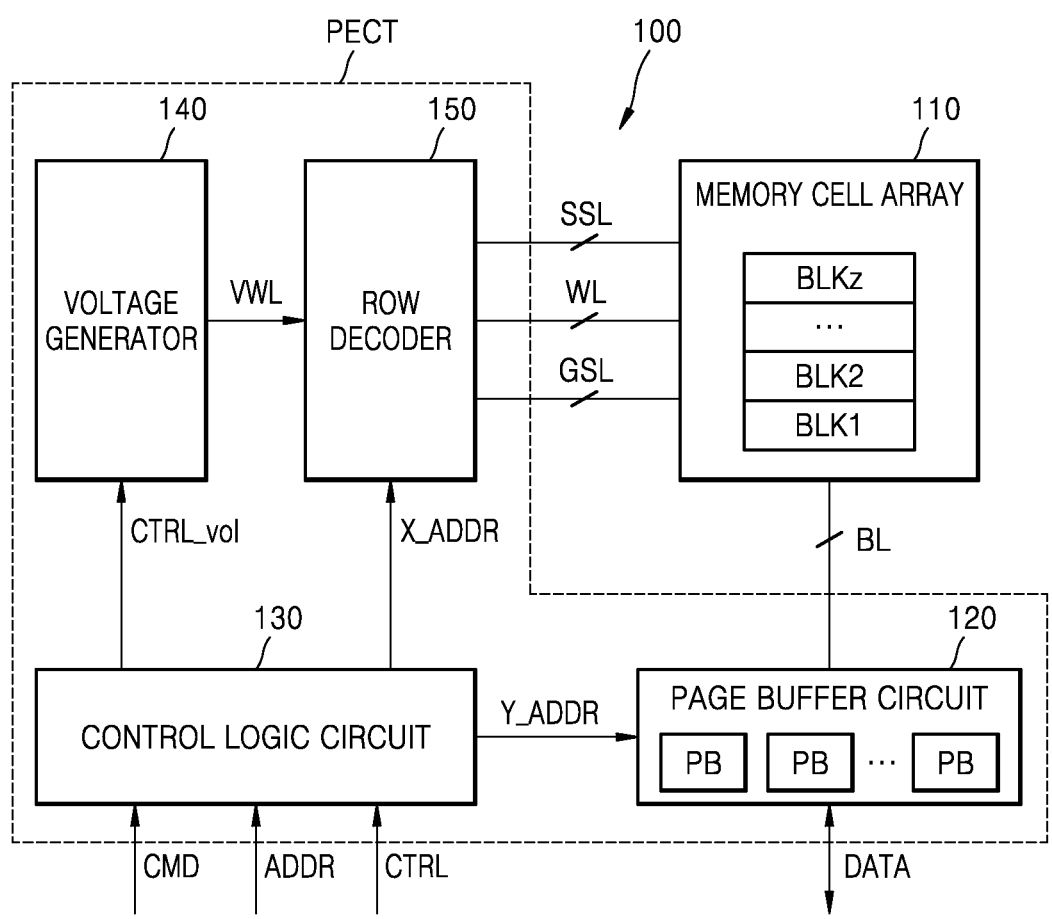
FIG. 1 is a block diagram showing a memory device, according to one or more embodiments.

FIG. 1 is a block diagram showing a memory device 100 according to one or more embodiments.

Referring to FIG. 1, the memory device 100 may include a memory cell array 110 and a peripheral circuit PECT. In one or more examples, the peripheral circuit PECT may include a page buffer circuit 120, a control logic circuit 130, a voltage generator 140, and a row decoder 150. The peripheral circuit PECT may further include a data input/output circuit, an input/output interface, etc. The peripheral circuit PECT may further include a temperature sensor, a command decoder, an address decoder, etc. In the present disclosure, the memory device 100 may be referred to as a "non-volatile memory device".

The memory cell array 110 may include a plurality of memory blocks BLK1 to BLKz (e.g., z is a positive integer greater than zero), and the plurality of memory blocks BLK1 to BLKz may each include a plurality of memory cells. The memory cell array 110 may be connected to the page buffer circuit 120 through bit lines BL and may be connected to the row decoder 150 through word lines WL, string select lines SSL, and ground select lines GSL. In one or more examples, memory cells may be flash memory cells. Hereinafter, embodiments will be described in detail based on an example case where the memory cells are NAND flash memory cells. However, the present disclosure is not limited thereto, and, according to some embodiments, the memory cells may be resistive memory cells such resistive RAM (ReRAM) cells, phase change RAM (PRAM) cells, magnetic RAM (MRAM) cells or any other memory structure known to one of ordinary skill in the art.

In one or more embodiments, the memory cell array 110 may include a 3-dimensional memory cell array. The 3-dimensional memory cell array may include a plurality of NAND strings, and each NAND string may include memory cells connected to a respective word line from a plurality of word lines vertically stacked on a substrate. Detailed descriptions thereof will be given later with reference to FIG. 2. U.S. Pat. Nos. 7,679,133, 8,553,466, 8,654,587, 8,559,235, and U.S. Patent Application Publication No. 2011/0233648 disclose detailed suitable configurations for a 3-dimensional memory cell array including multiple levels and in which word lines and/or bit lines are shared between the levels. The entire contents of each of these disclosure are incorporated herein by reference. However, the present disclosure is not limited thereto. In some embodiments, the memory cell array 110 may include a 2-dimensional memory cell array, where the 2-dimensional memory cell array may include a plurality of NANDs arranged in a row-wise direction and a column-wise direction.

The page buffer circuit 120 may include a plurality of page buffers PB. The plurality of page buffers PB may be connected to memory cells of the memory cell array 110 via one or more bit lines BL. The page buffer circuit 120 may select at least one bit line from among the bit lines BL under the control of the control logic circuit 130. For example, the page buffer circuit 120 may select one or more bit lines from among the bit lines BL in response to a column address Y_ADDR received from the control logic circuit 130. The each page buffer in the plurality of page buffers PB may operate as a write driver or a sense amplifier. For example, in a program operation, each page buffer in the plurality of page buffers PB may store data DATA to be programmed in memory cells by applying a voltage corresponding to the data DATA to a bit line. For example, in a program verify operation or a read operation, each page buffer in the plurality of page buffers PB may sense programmed data DATA by sensing a current or a voltage through a bit line.

The control logic circuit 130 may output various control signals, including, but not limited to, a voltage control signal CTRL_vol, a row address X_ADDR, and a column address Y_ADDR. These control signals may be used for programming data to the memory cell array 110, read data from the memory cell array 110, or erasing data stored in the memory cell array 110, based on a command CMD, an address ADDR, and a control signal CTRL. Therefore, the control logic circuit 130 may overall control various operations within the memory device 100. For example, the control logic circuit 130 may receive a command CMD, an address ADDR, and a control signal CTRL from a memory controller.

The voltage generator 140 may generate various types of voltages for performing a program operation, a read operation, and an erase operation on the memory cell array 110 based on the voltage control signal CTRL_Vol. The voltage generator 140 may generate a word line voltage VWL, for example, a program voltage, a read voltage, a pass voltage, an erase verify voltage, or a program verify voltage. Furthermore, the voltage generator 140 may further generate a string select line voltage and a ground select line voltage based on the voltage control signal CTRL_Vol.

The row decoder 150 may select one of the plurality of memory blocks BLK1 to BLKz in response to a row address X_ADDR received from the control logic circuit 130, select one of word lines WL of a selected memory block, and select one of the plurality of string select lines SSL. For example, the row decoder 150 may apply a program voltage and a program verify voltage to a selected word line during a program operation and may apply a read voltage to a selected word line during a read operation.

Figure 19:
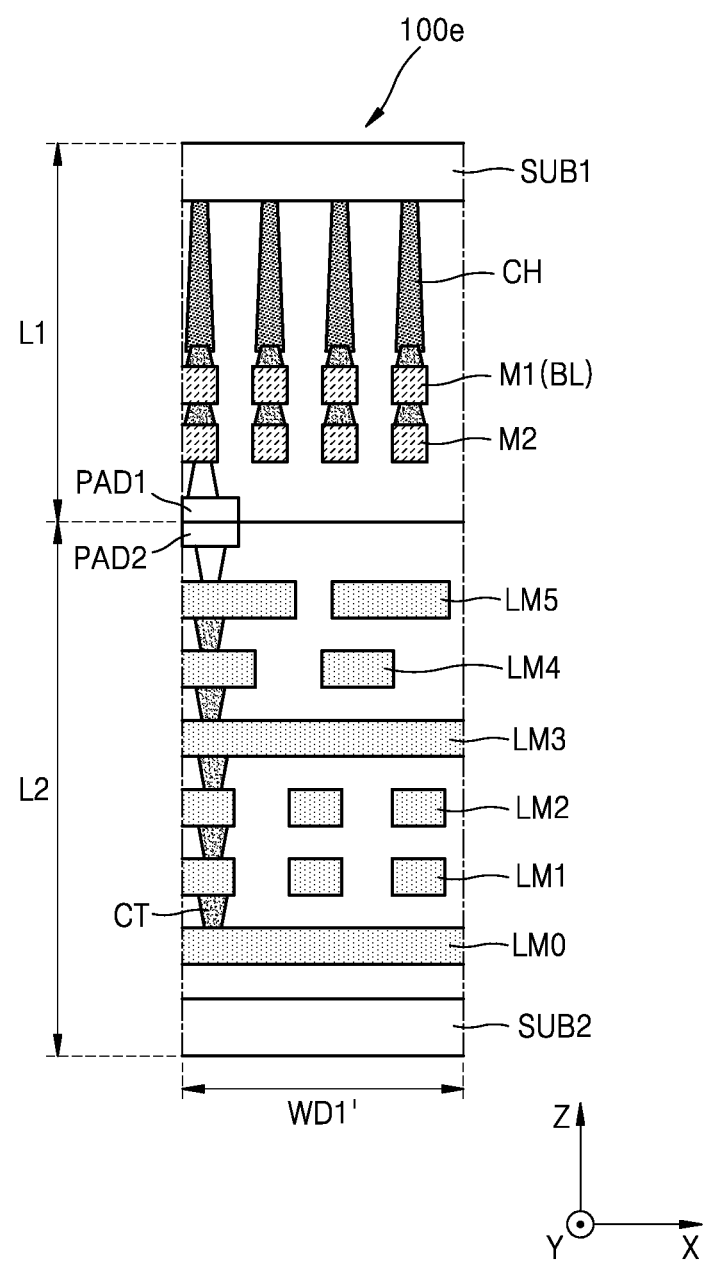
FIG. 19 is a cross-sectional view of a memory device according to one or more embodiments.
Figure 20:
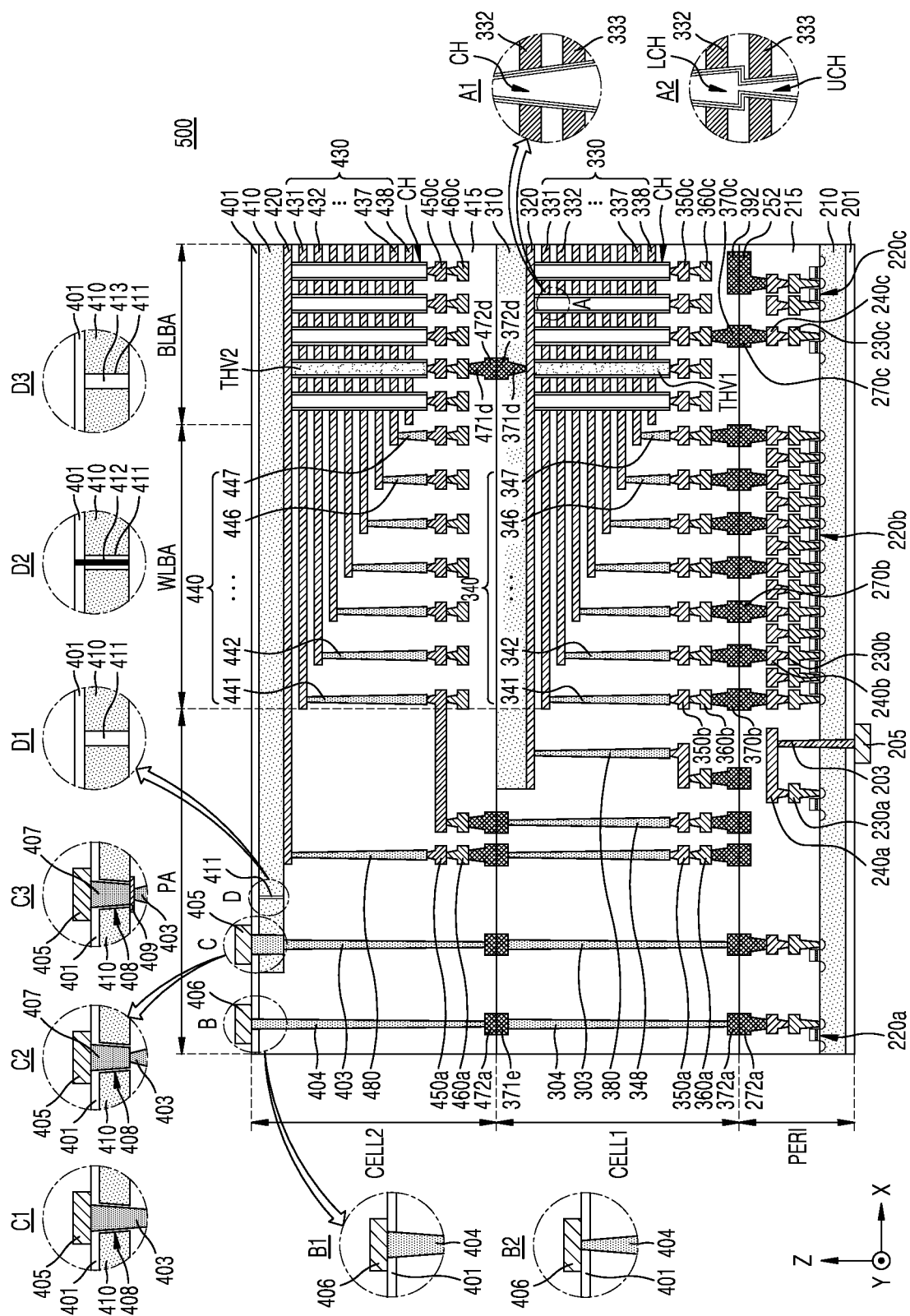
FIG. 20 is a cross-sectional view of a memory device having a bonding vertical NAND (B-VNAND) structure, according to one or more embodiments.

According to one or more embodiments, the memory cell array 110 may be disposed on a first semiconductor layer (e.g., L1 of FIGS. 3, 11A, 13 to 15, or FIG. 19 or CELL1 or CELL2 of FIG. 20), and the peripheral circuit PECT may be disposed on a second semiconductor layer (e.g., L2 of FIGS. 3, 11A, 13 to 15, or 19 or PERI of FIG. 20). In one or more examples, at least a portion of the peripheral circuit PECT may overlap the memory cell array 110 in a vertical direction.

Figure 2:
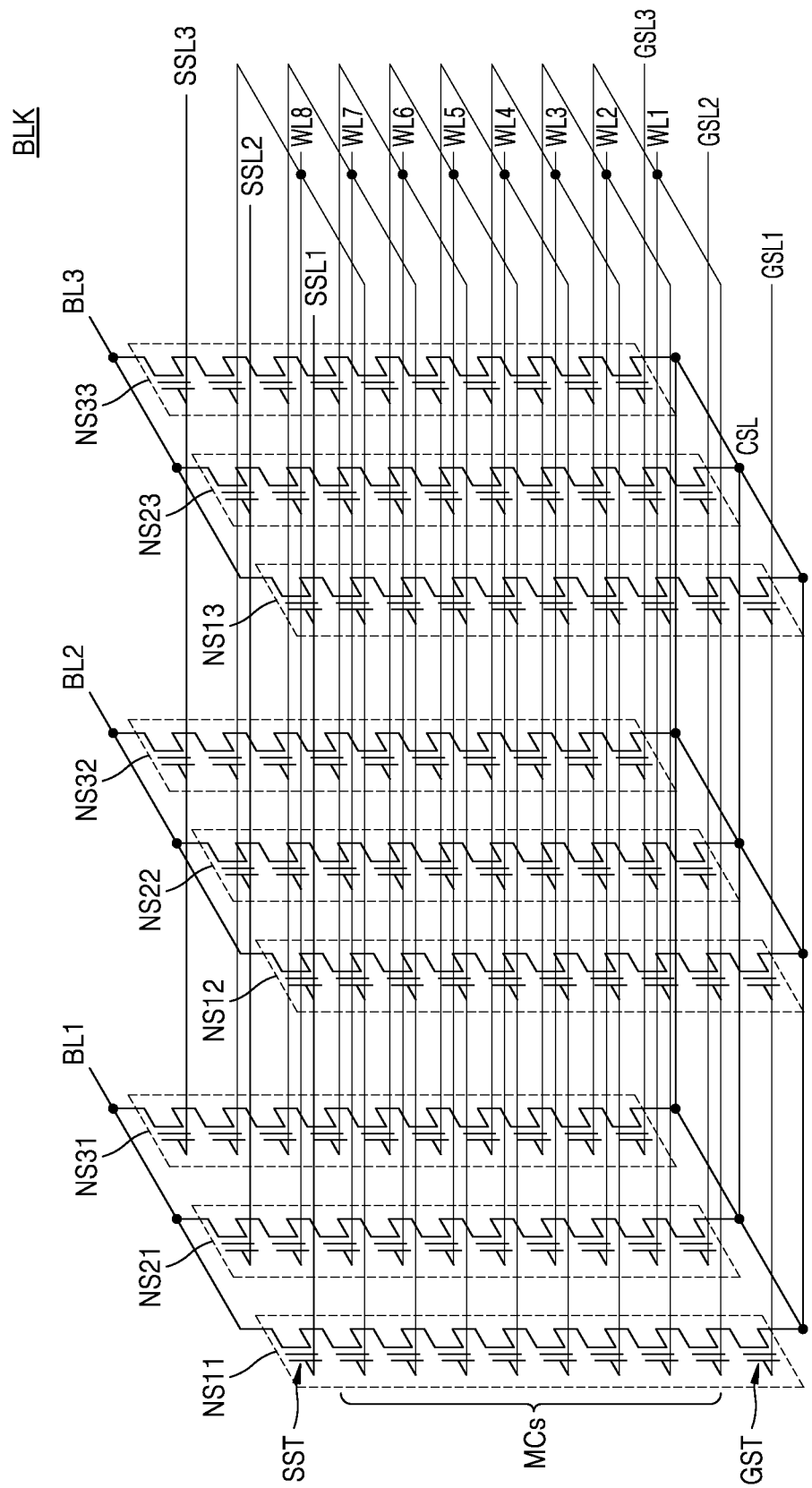
FIG. 2 is a circuit diagram showing a memory block, according to one or more embodiments of the present disclosure.

FIG. 2 is a circuit diagram showing a memory block BLK according to one or more embodiments.

Referring to FIG. 2, the memory block BLK may correspond to one of the memory blocks BLK1 to BLKz of FIG. 1. The memory block BLK may include NAND strings NS11 to NS33. Each NAND string (e.g., NS11) may include a string select transistor SST, a plurality of memory cells MCs, and a ground select transistor GST connected in series. The string select transistor SST, the ground select transistor GST, and the memory cells MCs included in each NAND string may form a stacked structure on a substrate in a vertical direction. As understood by one of ordinary skill in the art, the NAND string is not limited to this structure and may include any suitable configuration.

Figure 3:
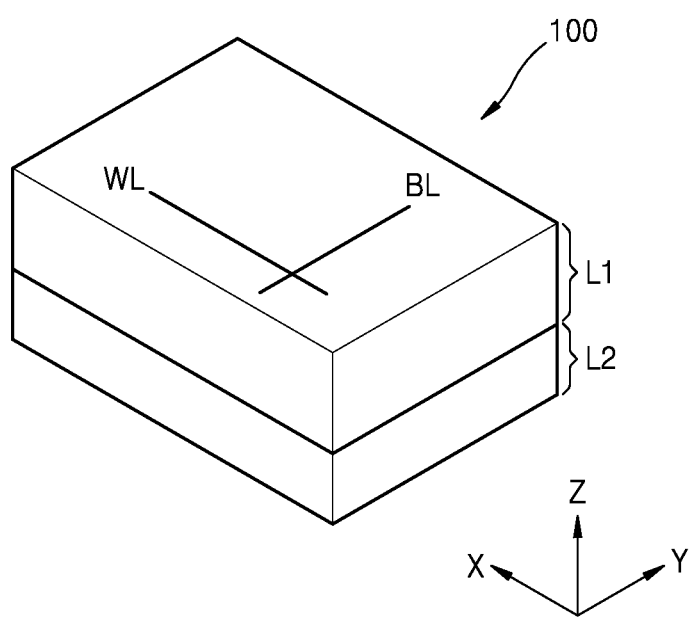
FIG. 3 is a diagram schematically showing the structure of a memory device, according to one or more embodiments.

Bit lines BL1 to BL3 may extend in a first direction (e.g., the Y direction in FIG. 3), and word lines WL1 to WL8 may extend in a second direction (e.g., the X direction in FIG. 3). The first and second directions may be orthogonal to each other in the same plane. According to one or more embodiments, the first direction may be referred to as a first horizontal direction, and the second direction may be referred to as a second horizontal direction. In one or more embodiments, one of the first and second directions may be referred to as a latitudinal direction, and the other of the first and second directions may be referred to as a longitudinal direction. NAND cell strings NS11, NS21, and NS31 may be provided between a first bit line BL1 and a common source line CSL, NAND cell strings NS12, NS22, and NS32 may be provided between a second bit line BL2 and the common source line CSL, and NAND cell strings NS13, NS23, and NS33 may be provided between a third bit line BL3 and the common source line CSL.

The string select transistor SST may be coupled to corresponding string select lines SSL1 to SSL3. The memory cells MCs may be respectively connected to corresponding word lines WL1 to WL8. The ground select transistor GST may be coupled to corresponding ground select lines GSL1 to GSL3. The string select transistors SST may be respectively connected to a corresponding bit line BL, and the ground select transistor GST may be connected to the common source line CSL. In one or more examples, the number of NAND strings, the number of word lines, the number of bit lines, the number of ground select lines, and the number of string select lines may vary according one or more embodiments.

FIG. 3 is a diagram schematically showing the structure of the memory device 100 according to one or more embodiments.

Referring to FIGS. 1 and 3 together, the memory device 100 may include a first semiconductor layer L1 and a second semiconductor layer L2, and the first semiconductor layer L1 may be stacked in a vertical direction Z with respect to the second semiconductor layer L2. In detail, the second semiconductor layer L2 may be disposed below the first semiconductor layer L1 in the vertical direction Z. According to one or more embodiments, the memory cell array 110 may be formed in the first semiconductor layer L1, and the peripheral circuit PECT may be formed in the second semiconductor layer L2. Therefore, the memory device 100 may have a structure in which the memory cell array 110 may be disposed above the peripheral circuit PECT. For example, a cell-over-periphery (COP) structure or a bonding VNAND (B-VNAND) structure. During fabrication, the second semiconductor layer L2 may be formed first with the peripheral circuit PECT formed therein, and the first semiconductor layer L1 may be formed thereafter on top of the second semiconductor with the memory cell array formed therein.

In one or more examples, in the first semiconductor layer L1, the plurality of bit lines BL may extend in a first direction Y, and the plurality of word lines WL may extend in a second direction X. The second semiconductor layer L2 may include a substrate, and the peripheral circuit PECT may be formed in the second semiconductor layer L2 by forming semiconductor devices including, but not limited to, transistors and patterns for distributing devices on the substrate.

According to one or more embodiments, when the memory device 100 has a COP structure, after the peripheral circuit PECT is formed in the second semiconductor layer L2, the first semiconductor layer L1 including the memory cell array 110 may be formed, and patterns for electrically connecting the word lines WL and bit lines BL of the memory cell array 110 to the peripheral circuit PECT formed in the second semiconductor layer L2 may be formed. According to one or more embodiments, when the memory device 100 has a B-VNAND structure, after the peripheral circuit PECT and bottom bonding pads are formed in the second semiconductor layer L2 and the memory cell array 110 and top bonding pads are formed in the first semiconductor layer L1, the top bonding pads on the first semiconductor layer L1 and the bottom bonding pads on the second semiconductor layer L2 may be connected to each other through bonding.

Figure 4:
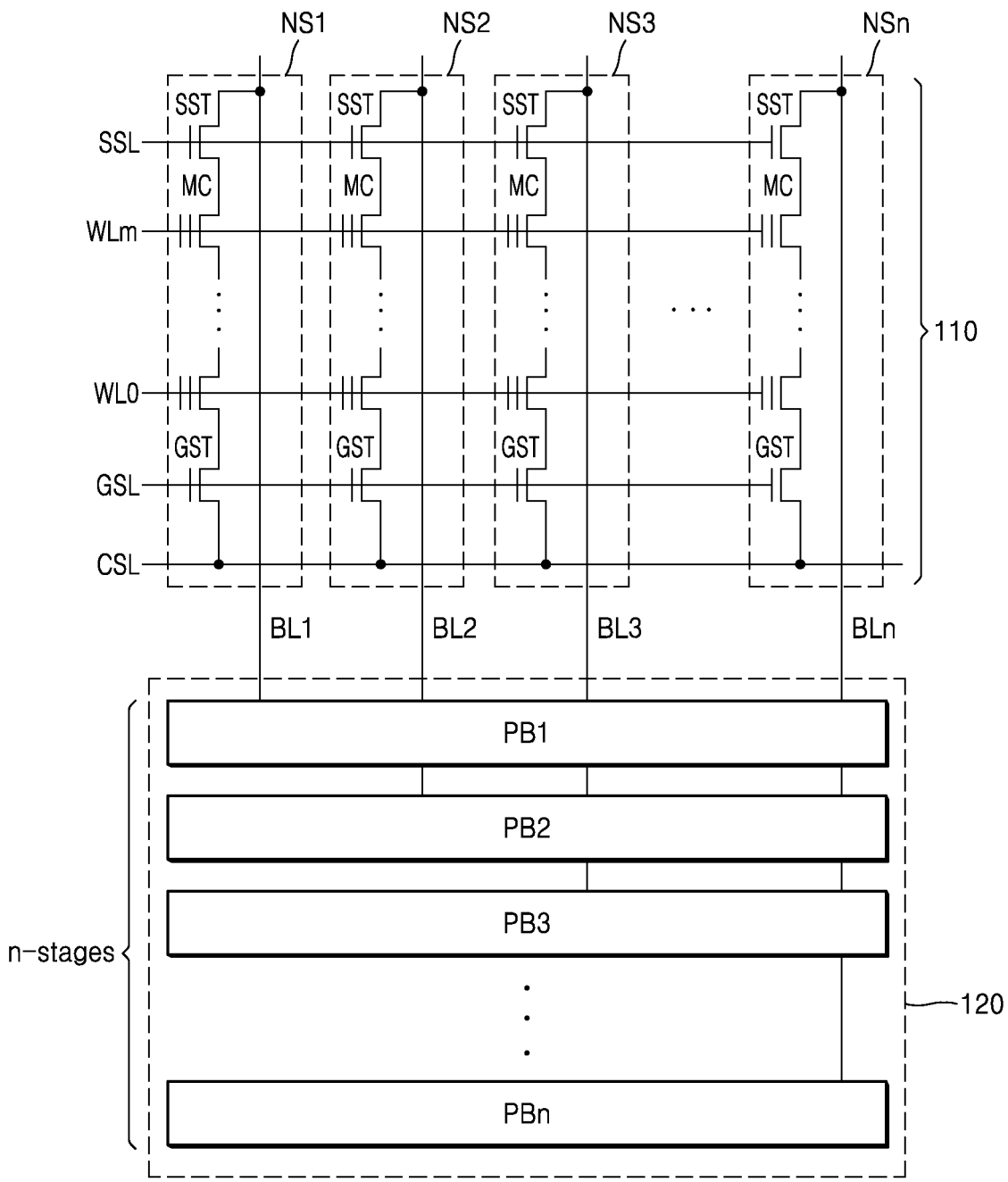
FIG. 4 is a diagram showing an example of a memory cell array and a page buffer circuit, according to one or more embodiments.

FIG. 4 is a diagram showing an example of the memory cell array 110 and the page buffer circuit 120 according to one or more embodiments.

Referring to FIG. 4, the memory cell array 110 may include first to n-th NAND strings NS1 to NSn. The first to n-th NAND strings NS1 to NSn may each include a ground select transistor GST connected to a ground select line GSL, a plurality of memory cells MC respectively connected to a plurality of word lines WL0 to WLm, and a string select transistor SST connected to a string select line SSL. The ground select transistor GST, the memory cells MC, and the string select transistor SST may be connected to one another in series. In one or more examples, m is a positive integer.

The page buffer circuit 120 may have a multi-stage structure including first to n-th page buffers PB1 to PBn. A first page buffer PB1 may be connected to a first NAND string NS1 through a first bit line BL1, and an n-th page buffer PBn may be connected to an n-th NAND string NSn through an n-th bit line BLn. In one or more examples, n is a positive integer. For example, the first to n-th page buffers PB1 to PBn may be arranged along a line in the extending direction of first to n-th bit lines BL1 to BLn.

According to one or more embodiments, n may be 6, and the page buffer circuit 120 may have a 6-stage structure in which 6-stage page buffers PB1 to PB6 are arranged in a row. Detailed descriptions thereof will be given later with reference to FIGS. 6 to 15. According to one or more embodiments, n may be 4, and the page buffer circuit 120 may have a 4-stage structure in which 4-stage page buffers PB1 to PB4 are arranged in a row. As understood by one of ordinary skill in the art, the embodiments are not limited to this configuration. Detailed descriptions thereof will be given later with reference to FIGS. 16 to 19.

Figure 5:
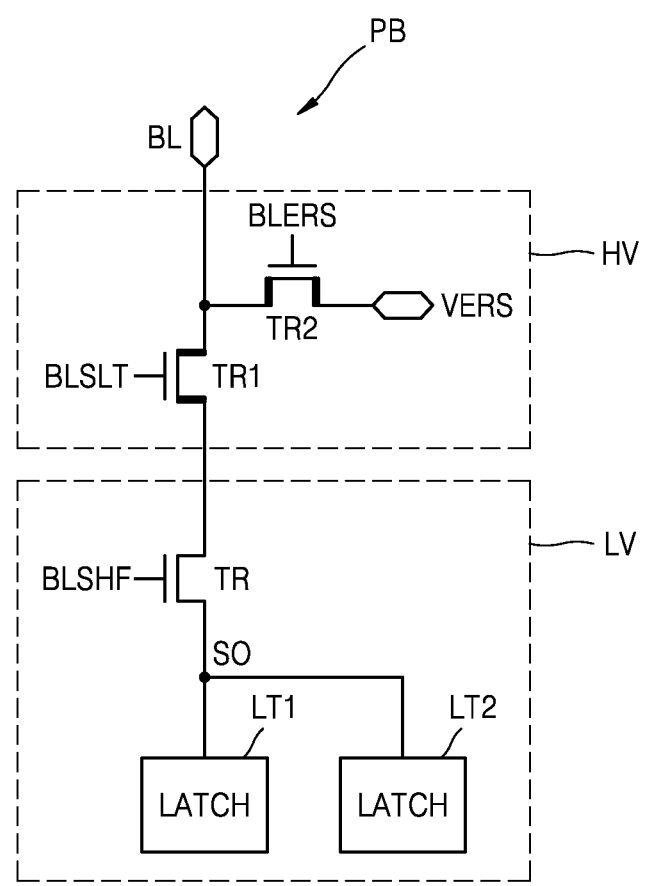
FIG. 5 is a diagram schematically showing a page buffer, according to one or more embodiments.

FIG. 5 is a diagram schematically showing the page buffer PB according to one or more embodiments.

Referring to FIG. 5, the page buffer PB may correspond to an example of the page buffer PB of FIG. 1. The page buffer PB may include a high voltage region HV and a low voltage region LV. The high voltage region HV may include a high voltage transistor TR1 connected to the bit line BL and driven by a bit line select signal BLSLT (e.g., a bit line select transistor TR1). Furthermore, the high voltage region HV may further include a high voltage transistor TR2 connected between the bit line BL and an erase voltage line VERS and driven by an erase control signal BLERS, such as, an erase transistor TR2. For example, high voltage transistors TR1 and TR2 may operate in a high voltage range of from about 2V to about 28V. For example, the high voltage region HV may be disposed in a first well region.

The low voltage region LV may include a transistor TR connected between a sensing node SO and the high voltage transistor TR1. The low voltage region LV may be driven by a bit line shut-off signal BLSHF (e.g., a bit line shut-off transistor TR). Furthermore, the low voltage region LV may further include a plurality of latches LT1 and LT2 connected to the sensing node SO. For example, the plurality of latches LT1 and LT2 may include a sensing latch, a force latch, a most significant bit latch, a least significant bit latch, a cache latch, etc. Furthermore, the low voltage region LV may further include a pre-charge circuit configured to control a pre-charge operation with respect to the bit line BL or the sensing node SO. For example, the low voltage region LV may be disposed in a second well region separated from the first well region.

Figure 6:
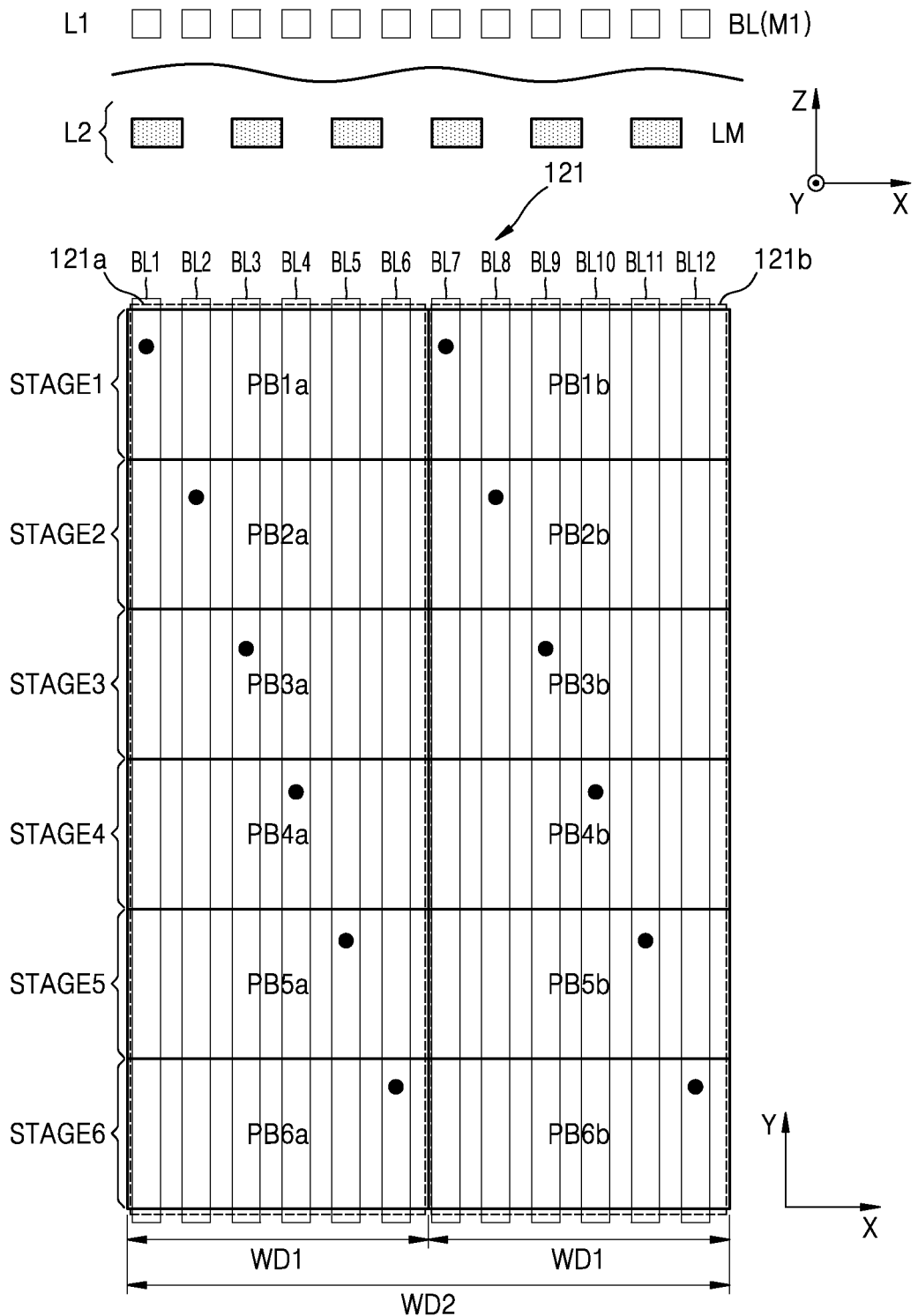
FIG. 6 is a plan view of an example of a page buffer circuit, according to one or more embodiments.

FIG. 6 is a plan view of an example of a page buffer circuit 121 according to one or more embodiments.

Referring to FIG. 6, the first semiconductor layer L1 may include the plurality of bit lines BL extending in the first direction Y. According to one or more embodiments, the plurality of bit lines BL may be implemented as a first upper metal layer M1. The second semiconductor layer L2 may include the page buffer circuit 121, and a lower metal layer LM extending in the first direction Y may be disposed above the page buffer circuit 121. The second semiconductor layer L2 may further include at least one metal layer disposed above the lower metal layer LM and/or at least one metal layer disposed below the lower metal layer LM. For example, the second semiconductor layer L2 may include three or more lower metal layers arranged in the vertical direction Z as a non-limiting configuration. In the present disclosure, a "metal layer" may be referred to as a "conductive layer" and may not be limited to a layer including a metal material. For example, the conductive layer may include any suitable conductive material known to one of ordinary skill in the art.

The page buffer circuit 121 may include a first page buffer column 121a and a second page buffer column 121b adjacent to each other in the second direction X. The first page buffer column 121a may include first to sixth page buffers PB1a to PB6a arranged in the first direction Y, and the second page buffer column 121b may include first to sixth page buffers PB1b to PB6b arranged in the first direction Y. As described above, the first page buffer column 121a and the second page buffer column 121b may each have a 6-stage structure as a non-limiting configuration. Therefore, the area of the page buffer circuit 121 in the first direction Y may be advantageously reduced as compared to the prior art. Furthermore, due to the reduction of a bit line pitch, the area of the page buffer circuit 121 in the second direction X may also be advantageously reduced.

In one or more examples, first to sixth bit lines BL1 to BL6 extending in the first direction Y and spaced apart from one another in the second direction X may be arranged above the first page buffer column 121a. The first page buffer column 121a may have a first width WD1 in the second direction X, and the first width WD1 may correspond to a pitch of the first to sixth bit lines BL1 to BL6. In this case, the first width WD1 may be referred to as "unit width" or "page buffer unit width". The first to sixth page buffers PB1a to PB6a may be connected to the first to sixth bit lines BL1 to BL6, respectively. The bit lines spaced apart in the second direction may be equally spaced apart by the same distance or spaced apart by a variable distance. For examples, bit lines BL1 to BL3 may be spaced apart by a distance X1, and bit lines BL4 to BL6 may be spaced apart by a distance X2 that is different than X1.

In one or more examples, seventh to twelfth bit lines BL7 to BL12 extending in the first direction Y and spaced apart from one another in the second direction X may be arranged above the second page buffer column 121b. For example, the second page buffer column 121b may have the first width WD1 in the second direction X, and the first width WD1 may correspond to the pitch of the seventh to twelfth bit lines BL7 to BL12. The first to sixth page buffers PB1b to PB6b may be connected to the seventh to twelfth bit lines BL7 to BL12, respectively. The total width of the first page buffer column 121a and the second page buffer column 121b may be a second width WD2 in the second direction X, and the second width WD2 may be twice the first width WD1. For example, the second width WD2 may correspond to the pitch of first to twelfth bit lines BL1 to BL12. Although FIG. 6 illustrates the first to sixth bit lines BL1 to BL6 and the seventh to twelfth bit lines BL7 to BL12 having width WD1, the first to sixth bit lines BL1 to BL6 may have a width that is different than a width of the seventh to twelfth bit lines BL7 to BL12. Furthermore, the number of bit lines is not limited to twelve, and may include any desired number of bit lines N, where N is a positive integer.

Figure 7:
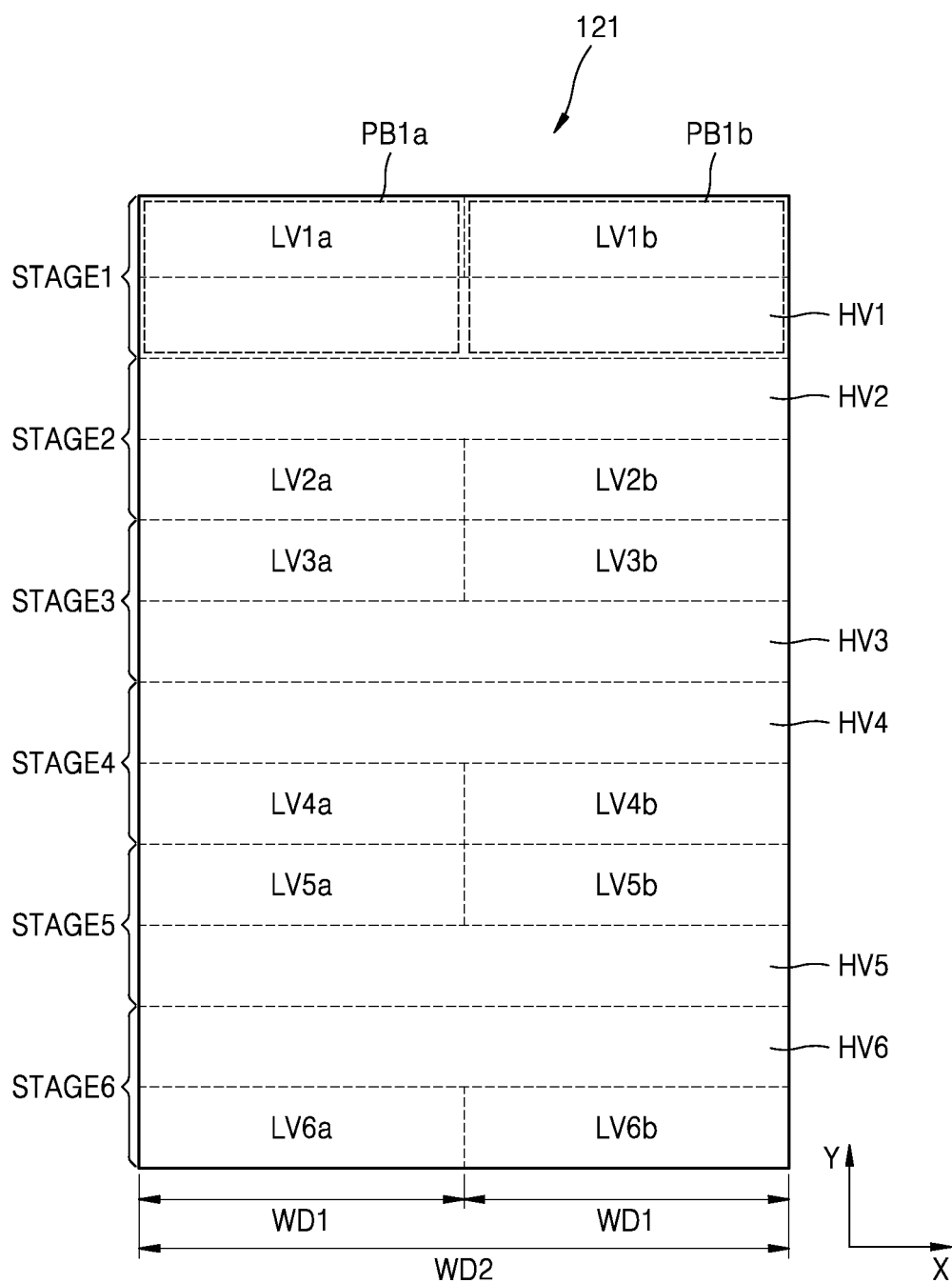
FIG. 7 is a plan view of the page buffer circuit of FIG. 6, according to one or more embodiments in more detail.

FIG. 7 is a plan view of the page buffer circuit 121 of FIG. 6 according to one or more embodiments in more detail.

Referring to FIGS. 6 and 7 together, the page buffer circuit 121 may have a non-limiting 6-stage structure. A first stage STAGE1 may include a first low voltage region LV1a, a second low voltage region LV1b, and a high voltage region HV1. In one or more examples, each of the first low voltage region LV1a and the second low voltage region LV1b has the first width WD1 in the second direction X, and the first low voltage region LV1a and the second low voltage region LV1b are adjacent to each other in the second direction X.

The first low voltage region LV1a and the second low voltage region LV1b may be separated from each other by a device isolation layer like a shallow trench isolation (STI). In one or more examples, the high voltage region HV1 has the second width WD2 in the second direction X and is adjacent to the first low voltage region LV1a and the second low voltage region LV1b in the first direction Y. For example, the high voltage region HV1 may be separated from the first low voltage region LV1a and the second low voltage region LV1b by a device isolation layer. In one or more examples, the first low voltage region LV1a and a portion of the high voltage region HV1 may constitute a first page buffer PB1a of the first page buffer column 121a, and the second low voltage region LV1b and the remaining of the high voltage region HV1 may constitute a first page buffer PB1b of the second page buffer column 121b.

In one or more examples, a second stage STAGE2 may include a high voltage region HV2 adjacent to the high voltage region HV1 in the first direction Y and a first low voltage region LV2a and a second low voltage region LV2b adjacent to each other in the second direction X. In one or more examples, the first low voltage region LV2a and a portion of the high voltage region HV2 may constitute a second page buffer PB2a of the first page buffer column 121a, and the second low voltage region LV2b and the remaining of the high voltage region HV2 may constitute a second page buffer PB2b of the second page buffer column 121b. As described above, the second stage STAGE2 may have a configuration mirrored from that of the first stage STAGE1 in the Y-axis direction. For example, the second stage STAGE2 may have a line-symmetrical structure with respect to the first stage STAGE1.

In one or more examples, a third stage STAGE3 may a first low voltage region LV3a adjacent to the first low voltage region LV2a in the first direction Y, a second low voltage region LV3b adjacent to the second low voltage region LV2b in the first direction Y, and a high voltage region HV3. In one or more examples, the first low voltage region LV3a and a portion of the high voltage region HV3 may constitute a third page buffer PB3a of the first page buffer column 121a, and the second low voltage region LV3b and the remaining of the high voltage region HV3 may constitute a third page buffer PB3b of the second page buffer column 121b. As described above, the third stage STAGE3 may have a configuration mirroring the second stage STAGE2 in the Y-axis direction.

In one or more examples, a fourth stage STAGE4 may include a high voltage region HV4 adjacent to the high voltage region HV3 in the first direction Y and a first low voltage region LV4a and a second low voltage region LV4b adjacent to each other in the second direction X. In one or more examples, the first low voltage region LV4a and a portion of the high voltage region HV4 may constitute a fourth page buffer PB4a of the first page buffer column 121a, and the second low voltage region LV4b and the remaining of the high voltage region HV4 may constitute a fourth page buffer PB4b of the second page buffer column 121b. As described above, the fourth stage STAGE4 may have a configuration mirroring the third stage STAGE3 in the Y-axis direction.

In one or more examples, a fifth stage STAGE5 may include a first low voltage region LV5a adjacent to the first low voltage region LV4a in the first direction Y, a second low voltage region LV5b adjacent to the second low voltage region LV4b in the first direction Y, and a high voltage region HV5. In one or more examples, the first low voltage region LV5a and a portion of the high voltage region HV5 may constitute a fifth page buffer PB5a of the first page buffer column 121a, and the second low voltage region LV5b and the remaining of the high voltage region HV5 may constitute a fifth page buffer PB5b of the second page buffer column 121b. As described above, the fifth stage STAGE5 may have a configuration mirroring the fourth stage STAGE4 in the Y-axis direction.

In one or more examples, a sixth stage STAGE6 may include a high voltage region HV6 adjacent to the high voltage region HV5 in the first direction Y and a first low voltage region LV6a and a second low voltage region LV6b adjacent to each other in the second direction X. In one or more examples, the first low voltage region LV6a and a portion of the high voltage region HV6 may constitute a sixth page buffer PB6a of the first page buffer column 121a, and the second low voltage region LV6b and the remaining of the high voltage region HV6 may constitute a sixth page buffer PB6b of the second page buffer column 121b. As described above, the sixth stage STAGE6 may have a configuration mirroring the fifth stage STAGE5 in the Y-axis direction.

Figure 8:
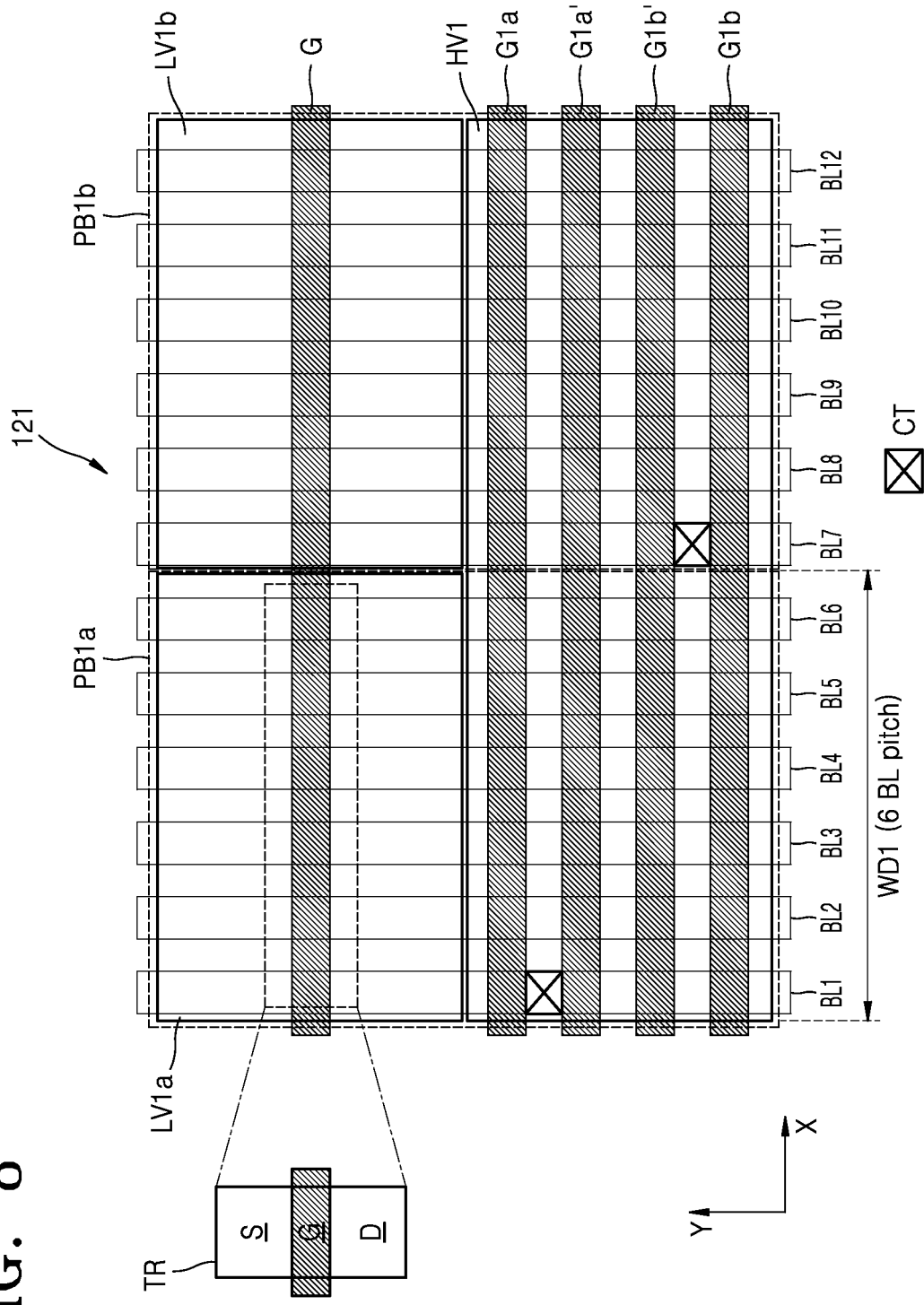
FIG. 8 is a plan view of first page buffers of the page buffer circuit of FIG. 7, according to one or more embodiments in more detail.

FIG. 8 is a plan view of first page buffers PB1a and PB1b of the page buffer circuit 121 of FIG. 7 according to one or more embodiments in more detail.

Referring to FIG. 8, the first page buffer PB1a may include the first low voltage region LV1a and a portion of the high voltage region HV1, and the first page buffer PB1b may include the second low voltage region LV1b and the rest of the high voltage region HV1 (e.g., the portion of the high voltage region HV1 not included in the first low voltage region LV1a). Gates G extending in the second direction X may be arranged in the first low voltage region LV1a and the second low voltage region LV1b. For example, a transistor TR may be disposed in the first low voltage region LV1a, and the transistor TR may have a source S, a gate G, and a drain D in the first direction Y. For example, a bit line shut-off signal (e.g., BLSHF of FIG. 5) may be applied to the gate G.

First gates G1a and G1a' extending in the second direction X may be arranged in the high voltage region HV1. For example, the first gates G1a and G1a' may be included in the first page buffer PB1a. For example, a first bit line select signal (e.g., BLSLT of FIG. 5) may be applied to a first gate G1a, and a first erase control signal (e.g., BLERS of FIG. 5) may be applied to a first gate G1a'. For example, the first bit line BL1 may be connected to an active region between the first gates G1a and G1a' through a contact CT.

Furthermore, second gates G1b and G1b' extending in the second direction X may be further arranged in the high voltage region HV1. For example, the second gates G1b and G1b' may be included in the first page buffer PB1b. For example, a second bit line selection signal may be applied to a second gate G1b, and a second erase control signal may be applied to a second gate G1b'. For example, a seventh bit line BL7 may be connected to an active region between the second gates G1b and G1b' through the contact CT.

Figure 9:
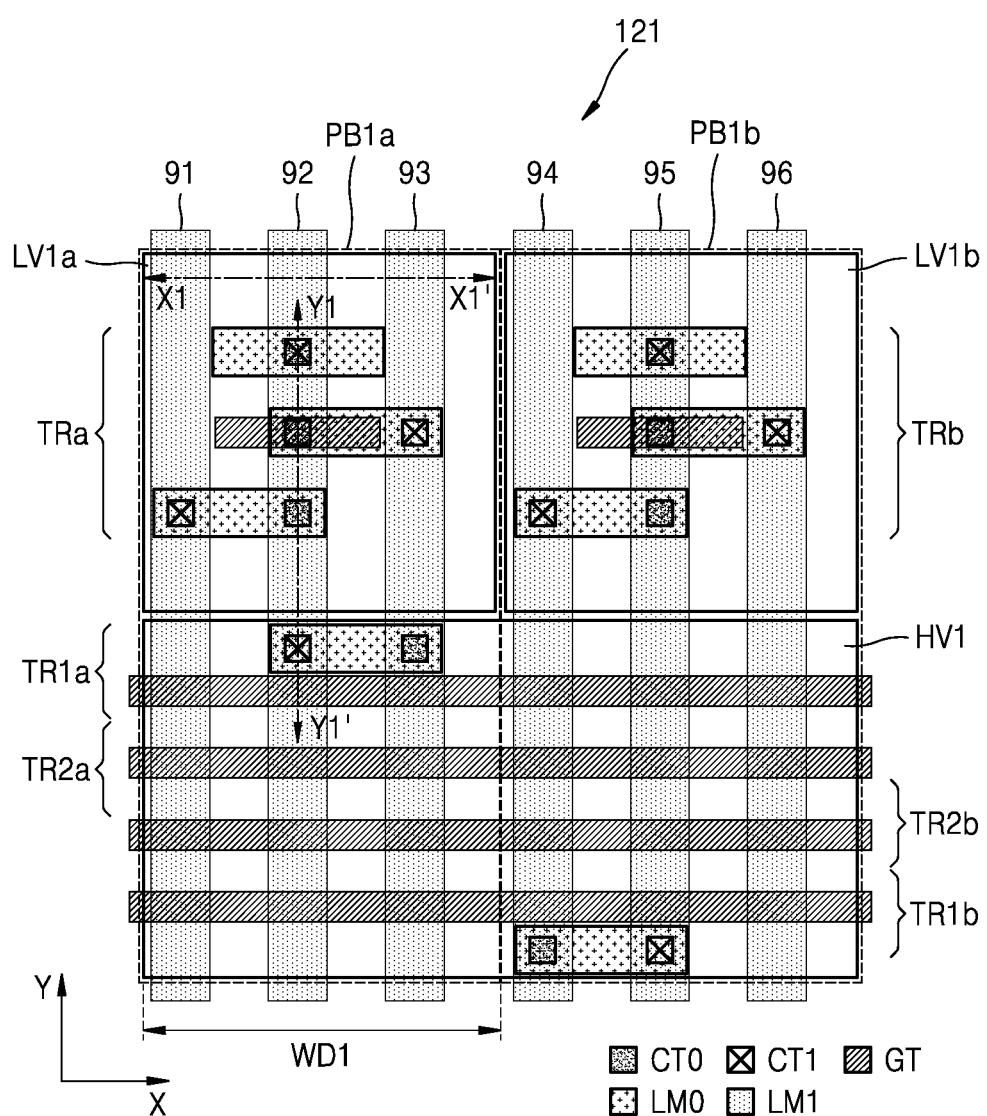
FIG. 9 is a plan view of first page buffers of the page buffer circuit of FIG. 8, according to one or more embodiments in more detail.

FIG. 9 is a plan view of first page buffers PB1a and PB1b of the page buffer circuit 121 of FIG. 8 according to one or more embodiments in more detail.

Referring to FIG. 9, the high voltage region HV1 may include first high voltage transistors TR1a and TR2a and second high voltage transistors TR1b and TR2b. In one or more examples, the first high voltage transistors TR1a and TR2a may be included in the first page buffer PB1a, and the second high voltage transistors TR1b and TR2b may be included in the first page buffer PB1b. For example, a portion of the high voltage region HV1 may be included in the first page buffer PB1a, and the remaining of the high voltage region HV1 may be included in the first page buffer PB1b. The first page buffer PB1a and the first page buffer PB1b may be provided on separate isolated columns. The first low voltage region LV1a may include a first transistor TRa connected to a first high voltage transistor TR1a, and the second low voltage region LV1b may include a second transistor TRb connected to a second high voltage transistor TR1b.

A first lower metal layer LM0 extending in the second direction X may be disposed above the first low voltage region LV1a, the second low voltage region LV1b, and the high voltage region HV1. For example, the first lower metal layer LM0 may include first to third metal patterns. Furthermore, a second lower metal layer LM1 extending in the first direction Y may be disposed above the first lower metal layer LM0, and, for example, the second lower metal layer LM1 may include first to third metal lines 91, 92, and 93. The second lower metal layer LM1 may be connected to the first lower metal layer LM0 through a contact CT1, and the first lower metal layer LM0 may be connected to an active region or a gate on a substrate, such as, drains, sources, and gates of first and second transistors TRa and TRb and first and second high voltage transistors TR1a, TR2a, TR1b, and TR2b, through contacts CT0.

As described above, the second lower metal layer LM1 may include three metal lines. For example, the three metal lines may include the first to third metal lines 91, 92, and 93 arranged above the first low voltage region LV1a having the first width WD1. The first to third metal lines 91, 92, and 93 may be connected to a drain, a source, and a gate of the first transistor TRa, respectively. The second lower metal layer LM1 may further include three metal lines such as, the fourth to sixth metal lines 94, 95, and 96 arranged above the second low voltage region LV1b having the first width WD1. The fourth to sixth metal lines 94, 95, and 96 may be connected to a drain, a source, and a gate of the second transistor TRb, respectively.

However, the present disclosure is not limited thereto, and, according to some embodiments, the second lower metal layer LM1 may include four metal lines arranged above the first low voltage region LV1a and four metal lines arranged above the second low voltage region LV1b. For example, within a unit width or a page buffer unit width, four lower metal lines may be arranged at the same level. For example, the pitch of lower metal lines may be reduced through the application of EUV equipment, and thus, four or more lower metal lines may be arranged at the same level within a unit width or a page buffer unit width. For example, the four lower metal lines may be used as a first power line, a second power line, a sensing node, and a signal line, respectively.

Although FIG. 9 shows one or more embodiments in which the second lower metal layer LM1 is connected to an active region or a gate on a substrate through the first lower metal layer LM0, the present disclosure is not limited thereto. According to some embodiments, the first lower metal layer LM0 may not be disposed above the first low voltage region LV1a, the second low voltage region LV1b, and the high voltage region HV1. For example, the first to third metal lines 91, 92, and 93 of the second lower metal layer LM1 may be connected to an active region or a gate on a substrate, such as, drains, sources, and gates of first and second transistors TRa and TRb and first and second high voltage transistors TR1a, TR2a, TR1b, and TR2b, through contacts CT0 and CRT1.

Figure 10:
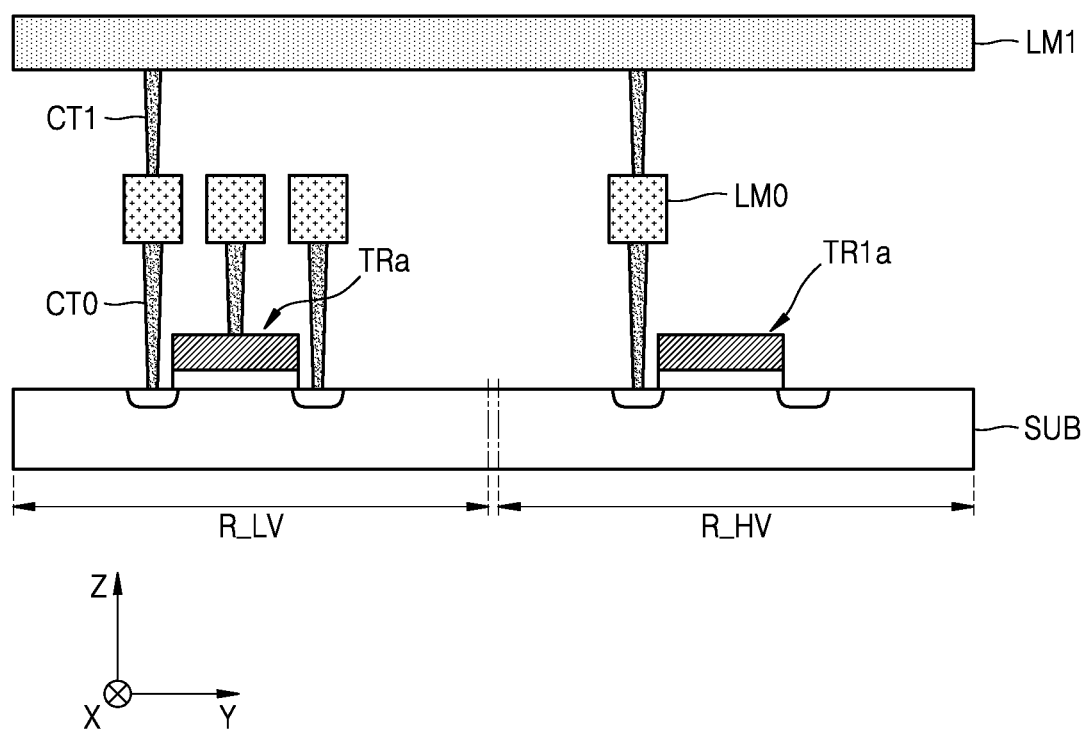
FIG. 10 is a cross-sectional view taken along a line Y1-Y1' of FIG. 9, according to one or more embodiments.

FIG. 10 is a cross-sectional view taken along a line Y1-Y1' of FIG. 9, according to one or more embodiments.

Referring to FIG. 10, a substrate SUB may include a first region R_LV and a second region R_HV. For example, the first region R_LV and the second region R_HV may correspond to well regions different from each other. The first region R_LV may correspond to the first low voltage region LV1a, and the second region R_HV may correspond to the high voltage region HV. The first transistor TRa may be disposed in the first region R_LV, and the first high voltage transistor TR1a may be disposed in the second region R_HV. A drain of the first high voltage transistor TR1a may be connected to the first lower metal layer LM0 through a contact CT0 and may be connected to the second lower metal layer LM1 through the contact CT1. A source of the first transistor TRa may be connected to the first lower metal layer LM0 through the contact CT0 and may be connected to the second lower metal layer LM1 through the contact CT1. For example, the second lower metal layer LM1 may correspond to a second metal line 92 of FIG. 9.

Figure 11A:
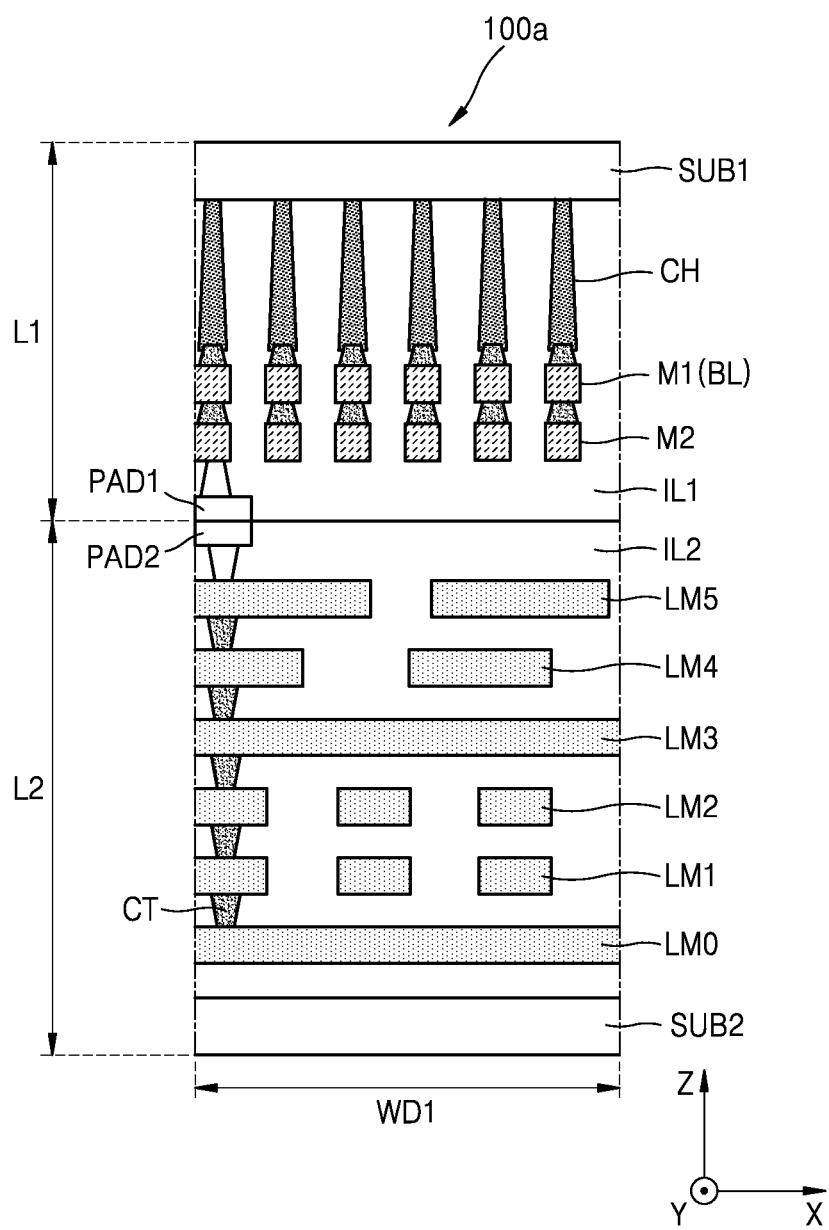
FIG. 11A is a cross-sectional view taken along a line X1-X1' of FIG. 9, according to one or more embodiments.
Figure 11B:
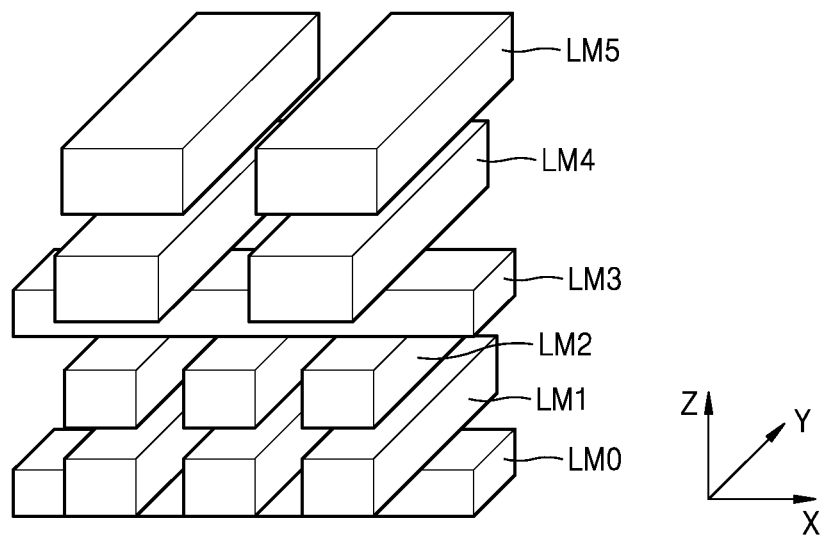
FIG. 11B is a perspective view of an example of a lower metal layer according to one or more embodiments.

FIG. 11A is a cross-sectional view taken along a line X1-X1' of FIG. 9, according to one or more embodiments, and FIG. 11B is a perspective view of an example of a lower metal layers according to one or more embodiments.

Referring to FIGS. 11A and 11B together, a memory device 100a may include the first semiconductor layer L1 and the second semiconductor layer L2 arranged in the vertical direction Z. The first semiconductor layer L1 may include a top bonding pad PAD1, and the second semiconductor layer L2 may include a bottom bonding pad PAD2. The first semiconductor layer L1 and the second semiconductor layer L2 may be coupled to each other through bonding of the top bonding pad PAD1 and the bottom bonding pad PAD2. As such, the memory device 100a may be implemented as a B-VNAND, but the present disclosure is not limited thereto.

The first semiconductor layer L1 may further include channel structures CH each extending in the vertical direction Z from an upper substrate SUB1. The first upper metal layer M1 and a second upper metal layer M2 may be arranged above the channel structures CH. For example, the first upper metal layer M1 and the second upper metal layer M2 may extend in the first direction Y. For example, the plurality of bit lines BL may be implemented as the first upper metal layer M1. The channel structures CH and the first upper metal layer M1 and the second upper metal layer M2 may be connected to each other through contacts CT. The first semiconductor layer L1 may further include an insulation layer IL1 covering the upper substrate SUB1, the channel structures CH, the first upper metal layer M1, the second upper metal layer M2, and the top bonding pad PAD1.

The second semiconductor layer L2 may include first to sixth lower metal layers LM0 to LM5 sequentially arranged over a lower substrate SUB2 in the vertical direction Z. For example, the lower substrate SUB2 may correspond to the substrate SUB of FIG. 10. The first to sixth lower metal layers LM0 to LM5 may be connected to one another through the contacts CT. The second semiconductor layer L2 may further include an insulation layer IL2 covering the lower substrate SUB2, the first to sixth lower metal layers LM0 to LM5, and the bottom bonding pad PAD2.

For example, second, third, fifth, and sixth lower metal layers LM1, LM2, LM4, and LM5 may extend in the first direction Y, and first and fourth lower metal layers LM0 and LM3 may extend in the second direction X. However, the present disclosure is not limited thereto, and a first lower metal layer LM1 or a fourth lower metal layer LM3 may extend in an oblique direction with respect to the first direction Y. For example, in a region corresponding to the first width WD1 or a unit width, the second lower metal layer LM1 may include three metal lines, and a third lower metal layer LM2 may also include three metal lines. However, the present disclosure is not limited thereto. For example, in a region corresponding to the first width WD1, a fifth lower metal layer LM4 may include two metal lines, and a sixth lower metal layer LM5 may also include two metal lines. However, the present disclosure is not limited thereto. In one or more examples, the insulation layers IL1 and IL2 may be formed of the same material. In one or more examples, the insulation layers IL1 and IL2 may be formed of different materials.

Figure 12A:
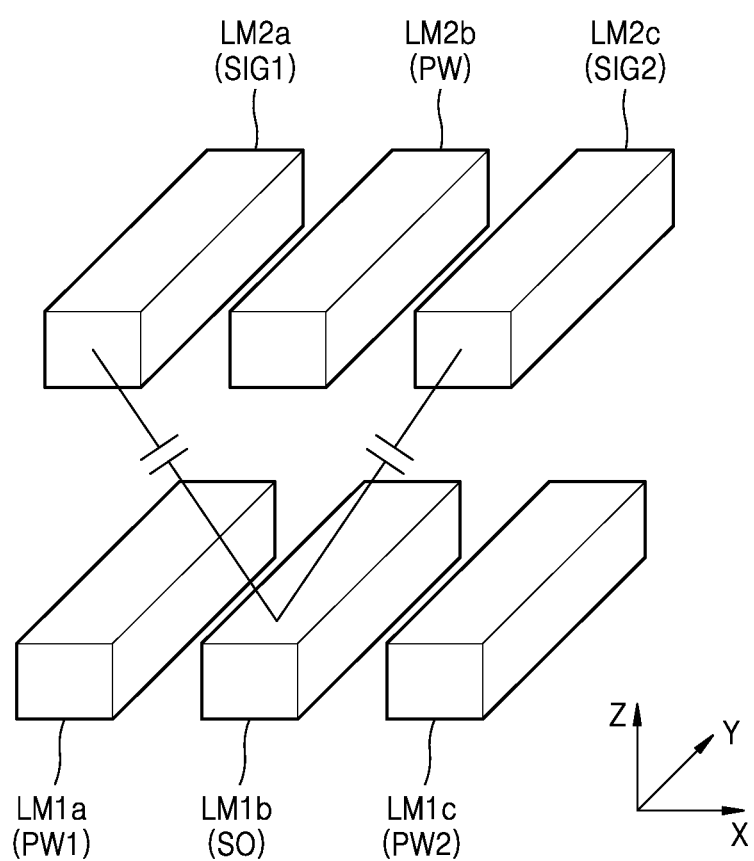
FIG. 12A is a diagram showing an example of lower metal layers corresponding to a unit width of a page buffer according to one or more embodiments.

FIG. 12A is a diagram showing an example of lower metal layers corresponding to a unit width of a page buffer according to one or more embodiments.

Referring to FIGS. 6 and 12A together, three metal lines (e.g., first to third metal lines LM1a, LM1b, and LM1c), may be arranged within a unit width of each of page buffers PB1a to PB6a. For example, within a first width WD1 and PB1b to PB6b, and three metal lines, fourth to sixth metal lines LM2a, LM2b, and LM2c, may be arranged above the first to third metal lines LM1a, LM1b, and LM1c. The first to third metal lines LM1a, LM1b, and LM1c may each extend in the first direction Y and may be spaced apart from one another in the second direction X. The fourth to sixth metal lines LM2a, LM2b, and LM2c may each extend in the first direction Y and may be spaced apart from one another in the second direction X.

For example, the first to third metal lines LM1a, LM1b, and LM1c may correspond to the second lower metal layer LM1 of FIG. 11A, and the fourth to sixth metal lines LM2a, LM2b, and LM2c may correspond to the third lower metal layer LM2 of FIG. 11A. However, the present disclosure is not limited thereto, and, according to one or more embodiments, the first to third metal lines LM1a, LM1b, and LM1c may correspond to the third lower metal layer LM2 of FIG. 11A, and the fourth to sixth metal lines LM2a, LM2b, and LM2c may correspond to the second lower metal layer LM1 of FIG. 11A. Hereinafter, one or more embodiments of voltages applied to the first to third metal lines LM1a, LM1b, and LM1c and the fourth to sixth metal lines LM2a, LM2b, and LM2c will be described in detail. The one or more embodiments described below are merely an example of the present disclosure, and various changes may be made in voltages applied to the first to third metal lines LM1a, LM1b, and LM1c and the fourth to sixth metal lines LM2a, LM2b, and LM2c according one or more embodiments.

According to one or more embodiments, a second metal line LM1b disposed in the middle from among the first to third metal lines LM1a, LM1b, and LM1c may correspond to the sensing node SO. On both sides of the second metal line LM1b where the sensing node SO is implemented, shielding metal lines to which a power voltage or a ground voltage is applied (e.g., a first metal line LM1a and a third metal line LM1c) may be arranged, thereby preventing coupling due to internal signal lines or adjacent sensing nodes. For example, a first power voltage PW1 may be applied to the first metal line LM1a, and a second power voltage PW2 may be applied to the third metal line LM1c. For example, the first power voltage PW1 may correspond to a positive supply voltage VCC or VDD, and the second power voltage PW2 may correspond to a ground voltage GND.

Furthermore, a power supply voltage PW may be applied to a fifth metal line LM2b. For example, the power voltage PW may correspond to the first power voltage PW1 or the second power voltage PW2. As understood by one of ordinary skill in the art, the present disclosure is not limited thereto, and may include any other suitable configurations. As such, a shielding metal line to which a power voltage or a ground voltage is applied (e.g., the fifth metal line LM2b), may be disposed above the second metal line LM1b where the sensing node SO is implemented, thereby further preventing coupling due to internal signal lines or adjacent sensing nodes.

A first internal signal SIG1 may be applied to a fourth metal line LM2a, and a second internal signal SIG2 may be applied to a sixth metal line LM2c. For example, the first internal signal SIG1, or the second internal signal SIG2, may correspond to a control signal or a driving signal applied to a transistor (e.g., TRa of FIG. 9). Voltage levels of the first internal signal SIG1 and the second internal signals SIG2 may vary according to the operation mode of a page buffer. However, as the fourth metal line LM2a and the sixth metal line LM2c are arranged relatively far from the second metal line LM1b where the sensing node SO is implemented, coupling with respect to the sensing node SO may be reduced in spite of variation of the voltage levels of the first internal signal SIG1 and the second internal signals SIG2. Therefore, during a read operation of a memory device, voltage variation of the sensing node SO may be reduced, thereby improving read reliability of the memory device.

FIG. 12A further shows one or more embodiments in which the sensing node SO and lower shielding metal lines are implemented in a lower metal layer (e.g., LM1) and internal signal lines and upper shielding metal lines are implemented in an upper metal layer (e.g., LM2). However, the present disclosure is not limited thereto, and, according to some embodiments, the sensing node SO may be implemented in an upper metal layer, upper shielding metal lines to which the power voltage VCC or VDD and the ground voltage GND are respectively provided may be arranged on both sides of the sensing node SO, a lower shielding metal line may be implemented in a lower metal layer, and internal signal lines to which the first internal signal SIG1 and the second internal signals SIG2 are applied may be arranged on both sides of the lower shielding metal line. Therefore, wiring connection efficiency may be improved by reducing a distance between internal signal lines and a transistor (e.g., TRa of FIG. 9). Furthermore, even in this case, the effect of reducing the coupling with respect to the sensing node SO may be maintained in spite of variation of the voltage levels of the first internal signal SIG1 and the second internal signals. Furthermore, FIG. 12A shows one or more embodiments in which lower shielding metal lines are arranged on both sides of the sensing node SO in a lower metal layer and internal signal lines are arranged on both sides of a shielding metal line in an upper metal layer. However, the present disclosure is not limited thereto, and, according to some embodiments, internal signal lines to which the first internal signal SIG1 and the second internal signals SIG2 are respectively applied may be arranged adjacent to each other. For example, the first internal signal SIG1 may be applied to the first metal line LM1a, the second internal signal SIG2 may be applied to the second metal line LM1b, and a power voltage or a ground voltage may be applied to the third metal line LM1c. Furthermore, a power voltage may be applied to the fourth metal line LM2a, a ground voltage may be applied to the sixth metal line LM2c, and the fifth metal line LM2b may correspond to the sensing node SO. Even in this case, since shielding metal lines are arranged on both sides of the sensing node SO, the effect of reducing coupling with respect to the sensing node SO may be maintained in spite of variation of the voltage levels of the first internal signal SIG1 and the second internal signals SIG2.

Figure 12B:
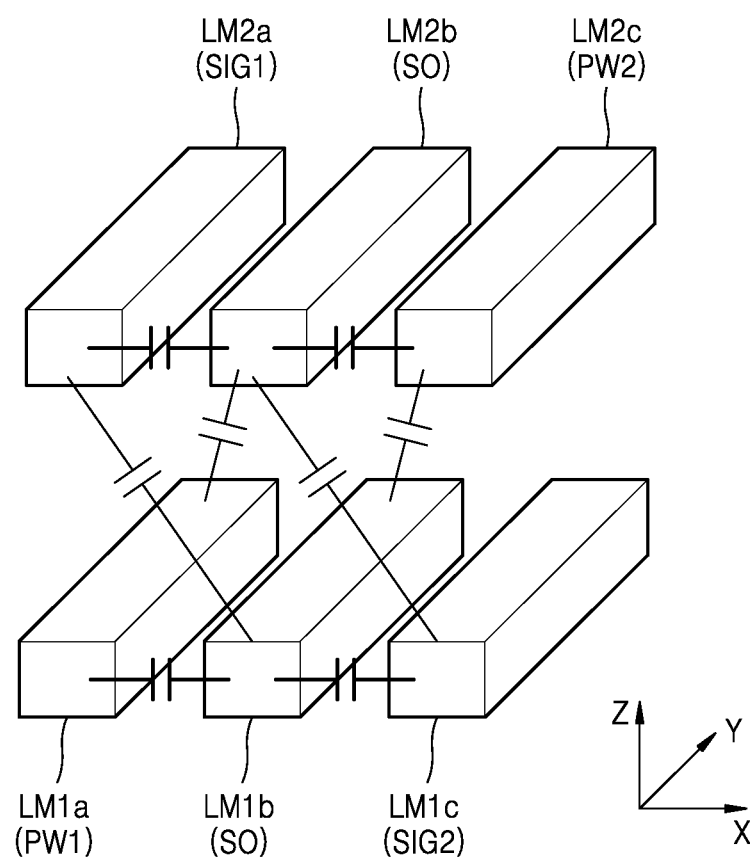
FIG. 12B is a diagram showing an example of lower metal layers corresponding to a unit width of a page buffer according to one or more embodiments.

FIG. 12B is a diagram showing an example of lower metal layers corresponding to a unit width of a page buffer, according to one or more embodiments.

Referring to FIGS. 6 and 12B together, three metal lines, such as the first to third metal lines LM1a, LM1b, and LM1c, may be arranged within a unit width of each of the page buffers PB1a to PB6a and PB1b to PB6b. For example, within a first width WD1 and three metal lines, the fourth to sixth metal lines LM2a, LM2b, and LM2c, may be arranged above the first to third metal lines LM1a, LM1b, and LM1c. The first to third metal lines LM1a, LM1b, and LM1c may each extend in the first direction Y and may be spaced apart from one another in the second direction X. The fourth to sixth metal lines LM2a, LM2b, and LM2c may each extend in the first direction Y and may be spaced apart from one another in the second direction X.

For example, the first to third metal lines LM1a, LM1b, and LM1c may correspond to the second lower metal layer LM1 of FIG. 11A, and the fourth to sixth metal lines LM2a, LM2b, and LM2c may correspond to the third lower metal layer LM2 of FIG. 11A. However, the present disclosure is not limited thereto, and, according to one or more embodiments, the first to third metal lines LM1a, LM1b, and LM1c may correspond to the third lower metal layer LM2 of FIG. 11A, and the fourth to sixth metal lines LM2a, LM2b, and LM2c may correspond to the second lower metal layer LM1 of FIG. 11A. Hereinafter, one or more embodiments of voltages applied to the first to third metal lines LM1a, LM1b, and LM1c and the fourth to sixth metal lines LM2a, LM2b, and LM2c will be described in detail. The one or more embodiments described below are merely examples of the present disclosure, and various changes may be made in voltages applied to the first to third metal lines LM1a, LM1b, and LM1c and the fourth to sixth metal lines LM2a, LM2b, and LM2c, according one or more embodiments.

According to one or more embodiments, the second metal line LM1b disposed in the middle between the first metal line LM1a and the third metal line LM1c may correspond to the sensing node SO, and the fifth metal line LM2b disposed in the middle between the fourth metal line LM2a and the sixth metal line LM2c may correspond to the sensing node SO. In one or more examples, the second metal line LM1b and the fifth metal line LM2b may be electrically connected to each other through a contact. According one or more embodiments, the fifth metal line LM2b may be referred to as a "sensing plus node."

As such, the sensing node SO of a page buffer may be implemented by using a plurality of metal layers arranged in the vertical direction Z, such as the second metal line LM1b and the fifth metal line LM2b, and thus, the total capacitance of the sensing node SO may increase. In detail, the total capacitance of the sensing node SO may be increased to have a sufficiently large value in relation to a sensing current to have robustness against variations in sensing conditions. Therefore, during reading, voltage variation of the sensing node SO may be reduced, and thus, read reliability of the sensing node SO may be improved.

The first power voltage PW1 may be applied to the first metal line LM1a, and the second power voltage PW2 may be applied to the sixth metal line LM2c. For example, the first power voltage PW1 may correspond to a positive supply voltage VCC or VDD, and the second power voltage PW2 may correspond to a ground voltage GND. The first internal signal SIG1 may be applied to the fourth metal line LM2a, and the second internal signal SIG2 may be applied to the third metal line LM1c. For example, the first internal signal SIG1, or the second internal signal SIG2, may correspond to a control signal or a driving signal applied to a transistor (e.g., TRa of FIG. 9).

FIG. 12B further shows one or more embodiments in which the sensing node SO, a lower shielding metal line, and an internal signal line are implemented in a lower metal layer (e.g., LM1). FIG. 12B further shows that the sensing node SO, an upper shielding metal line, and an internal signal line are implemented in an upper metal layer (e.g., LM2). However, the present disclosure is not limited thereto, and, according to some embodiments, internal signal lines to which the first internal signal SIG1 and the second internal signals SIG2 are applied may be arranged adjacent to each other. For example, the first internal signal SIG1 may be applied to the first metal line LM1a, the second internal signal SIG2 may be applied to the second metal line LM1b, and the third metal line LM1c may correspond to the sensing node SO. Furthermore, a power voltage may be applied to the fourth metal line LM2a, a ground voltage may be applied to the fifth metal line LM2b, and the sixth metal line LM2c may correspond to the sensing node SO. Even in this case, the total capacitance of the sensing node SO may increase.

Figure 13:
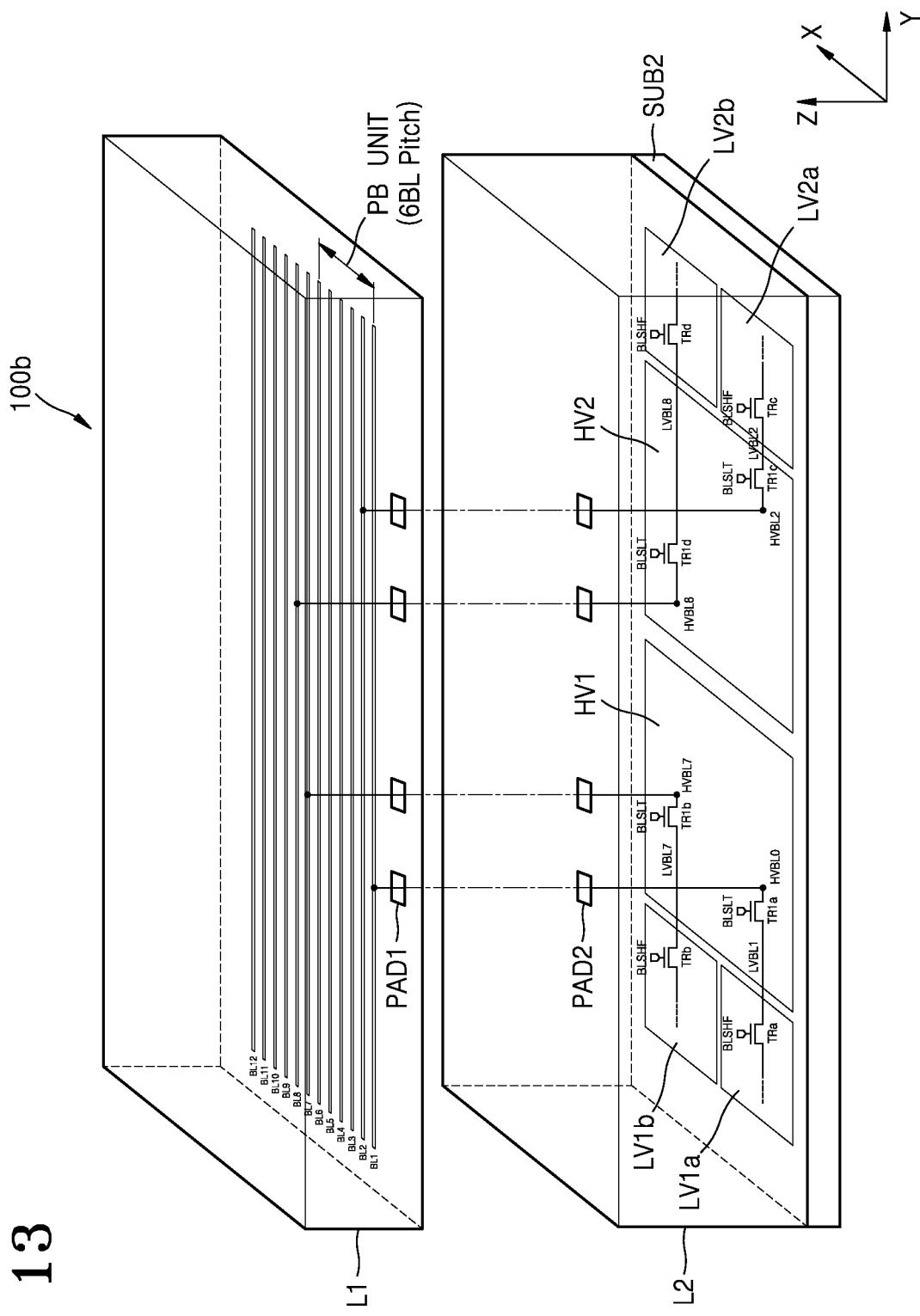
FIGS. 13 to 15 are diagrams showing memory devices, according to one or more embodiments.

FIG. 13 is a diagram showing a memory device 100b according to one or more embodiments.

Referring to FIG. 13, the memory device 100b may include the first semiconductor layer L1 and the second semiconductor layer L2 arranged in the vertical direction Z. The first semiconductor layer L1 may include first to twelfth bit lines BL1 to BL12 extending in the first direction Y and spaced apart from one another in the second direction X. The first semiconductor layer L1 may further include top bonding pads PAD1. For example, the pitch of six bit lines, such as first to sixth bit lines BL1 to BL6, may correspond to the unit size or the unit width of a page buffer.

The second semiconductor layer L2 may include bottom bonding pads PAD2. The second semiconductor layer L2 may be connected to the first semiconductor layer L1 through bonding between the top bonding pads PAD1 and the bottom bonding pads PAD2. The second semiconductor layer L2 may include high voltage regions HV1 and HV2, first low voltage regions LV1a and LV2a, and second low voltage regions LV1b and LV2b on the lower substrate SUB2. For example, the high voltage region HV1, the first low voltage region LV1a, and the second low voltage region LV1b may correspond to a first stage (e.g., STAGE1 of FIG. 7), and the high voltage region HV2, the first low voltage region LV2a, and the second low voltage region LV2b may correspond to a second stage (e.g., STAGE2 of FIG. 7).

The high voltage region HV1 may include the first high voltage transistor TR1a and the second high voltage transistor TR1b. For example, the first high voltage transistor TR1a may be connected to the first bit line BL1, which is one of the first to sixth bit lines BL1 to BL6, and the second high voltage transistor TR1b may be connected to the seventh bit line BL7, which is one of the seventh to twelfth bit lines BL7 to BL12. For example, the first bit line BL1 may be connected to the first high voltage transistor TR1a through the top bonding pad PAD1, the bottom bonding pad PAD2, and a first lower bit line HVBL1. For example, the seventh bit line BL7 may be connected to the second high voltage transistor TR1b through the top bonding pad PAD1, the bottom bonding pad PAD2, and a seventh lower bit line HVBL7. For example, the first high voltage transistor TR1a and the second high voltage transistor TR1b may correspond to the bit line select transistor TR1 of FIG. 5.

The first low voltage region LV1a may include the first transistor TRa. The first transistor TRa may be connected to the first high voltage transistor TR1a through a wire LVBL1. The second low voltage region LV1b may include the second transistor TRb. The second transistor TRb may be connected to the second high voltage transistor TR1b through a wire LVBL7. In one or more examples, wires LVBL1 and LVBL7 may each be implemented by the first lower metal layer LM0, the second lower metal layer LM1 and contacts CT0 and CT1 of FIG. 10. In one or more examples, the first transistor TRa and the second transistor TRb may correspond to the bit line shut-off transistor TR of FIG. 5.

The high voltage region HV2 may include a first high voltage transistor TR1c and a second high voltage transistor TR1d. For example, the first high voltage transistor TR1c may be connected to the second bit line BL2, which is one of the first to sixth bit lines BL1 to BL6, and the second high voltage transistor TR1d may be connected to an eighth bit line BL8, which is one of the seventh to twelfth bit lines BL7 to BL12. In one or more examples, the second bit line BL2 may be connected to the first high voltage transistor TR1c through the top bonding pad PAD1, the bottom bonding pad PAD2, and a second lower bit line HVBL2. In one or more examples, the eighth bit line BL8 may be connected to the second high voltage transistor TR1d through the top bonding pad PAD1, the bottom bonding pad PAD2, and an eighth lower bit line HVBL8.

The first low voltage region LV2a may include the first transistor TRc. The first transistor TRc may be connected to the first high voltage transistor TR1c through a wire LVBL2. The second low voltage region LV2b may include a second transistor TRd. The second transistor TRd may be connected to the second high voltage transistor TR1d through a wire LVBL8. For example, wires LVBL2 and LVBL8 may each be implemented by the first lower metal layer LM0, the second lower metal layer LM1 and contacts CT0 and CT1 of FIG. 10.

Figure 14:
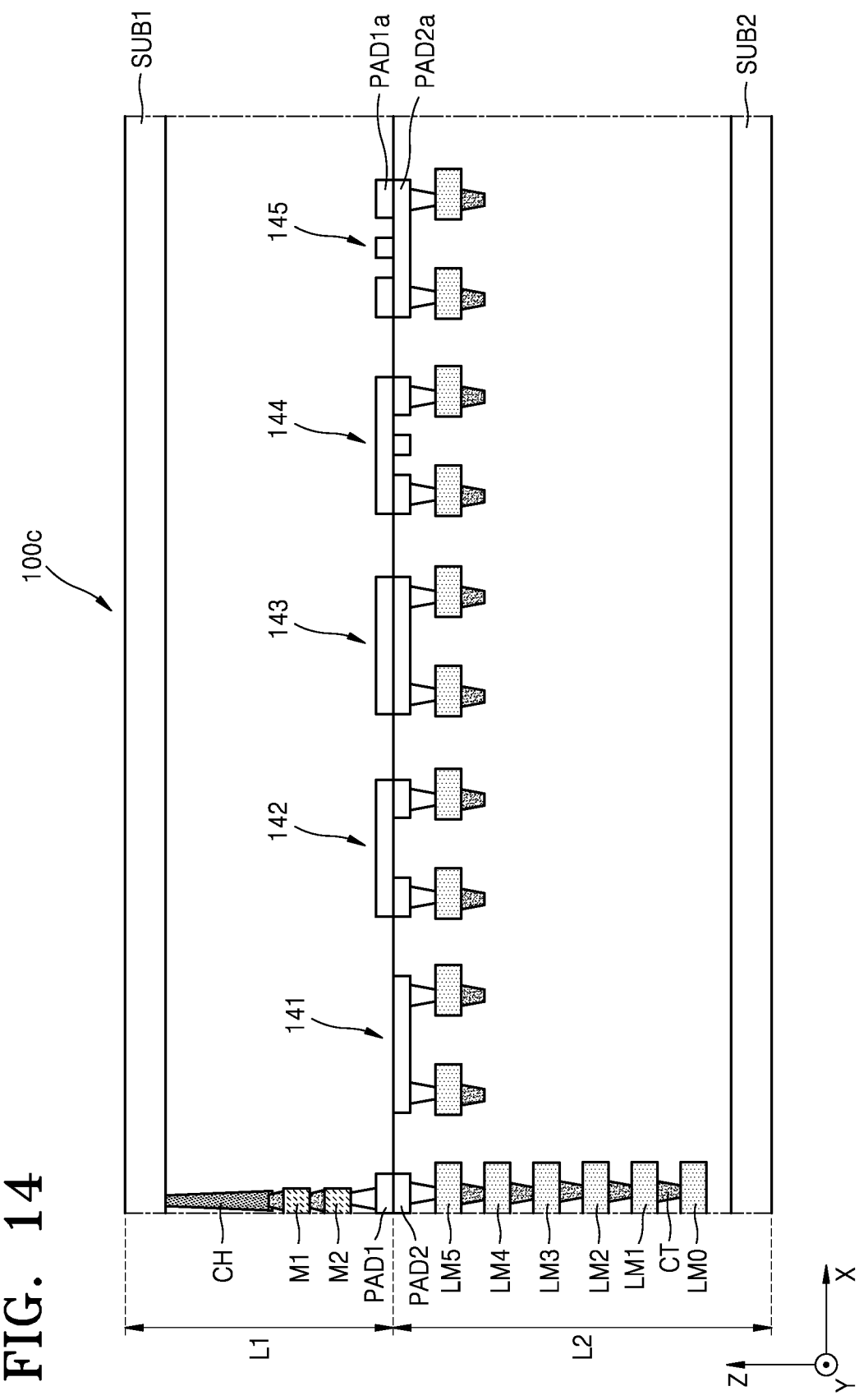

FIG. 14 is a diagram showing a memory device 100c according to one or more embodiments.

Referring to FIG. 14, the memory device 100c may include the first semiconductor layer L1 and the second semiconductor layer L2 arranged in the vertical direction Z. For example, the first semiconductor layer L1 may be stacked on top of the second semiconductor layer L2. The first semiconductor layer L1 may include a channel structure CH extending in the vertical direction Z on the upper substrate SUB1. The channel structure CH may be connected to the top bonding pad PAD1 through first and second metal layers M1 and M2. The second semiconductor layer L2 may include the first to sixth lower metal layers LM0 to LM5 sequentially arranged on the lower substrate SUB2 in the vertical direction Z and the bottom bonding pad PAD2.

The first semiconductor layer L1 may further include an upper pad PAD1a, and the second semiconductor layer L2 may further include a lower pad PAD2a. The upper pad PAD1a may not be connected to the channel structure CH or a bit line, and thus, the upper pad PAD1a may be referred to as an "upper dummy pad," which may be a pad in a layer that is not used. The upper pad PAD1a may be connected to the lower pad PAD2a, and thus, the upper pad PAD1a may be used as a wire connected to a peripheral circuit (e.g., PECT of FIG. 1) or an internal wire of the peripheral circuit. In one or more examples, the upper pad PAD1a and/or the lower pad PAD2a may be used as logic signal lines and/or analog signal lines.

According to some embodiments, the memory device 100c may further include at least one of first to fifth wiring structures 141 to 145. In the first to fifth wiring structures 141 to 145, the sixth lower metal layer LM5 may be connected to at least one of first to fifth lower metal layers LM0 to LM4. For example, one or more of the first to fifth wiring structures 141 to 145 may include a plurality of upper pads PAD1a and/or a plurality of lower pads PAD2a. For example, one or more of the first to fifth wiring structures 141 to 145 may include the upper pad PAD1a or the lower pad PAD2a extending in the second direction X. For example, one or more of the first to fifth wiring structures 141 to 145 may be connected to a plurality of lower metal lines arranged on the same level. However, the present disclosure is not limited thereto, and one or more of the first to fifth wiring structures 141 to 145 may be connected to a lower metal line disposed on one level and a lower metal line disposed on a different level. Hereinafter, the detailed configuration of the first to fifth wiring structures 141 to 145 will be described.

In a first wiring structure 141, the lower pad PAD2a may be used as a wire connecting metal lines of the sixth lower metal layer LM5 to one another. In a second wiring structure 142, the upper pad PAD1a may be commonly connected to the lower pads PAD2a each connected to a respective metal line of the sixth lower metal layer LM5, and thus, the upper pad PAD1a may be used as a wire for connecting the metal lines of the sixth lower metal layer LM5 to one another. In a third wiring structure 143, the lower pad PAD2a may be commonly connected to the metal lines of the sixth lower metal layer LM5 and the upper pad PAD1a may be connected to the lower pad PAD2a, and thus, the upper pad PAD1a and the lower pad PAD2a may be used as wires connecting the metal lines of the sixth lower metal layer LM5 to one another.

In a fourth wiring structure 144, the upper pad PAD1a may be commonly connected to the plurality of lower pads PAD2a, and one or more of the plurality of lower pads PAD2a may each be connected to a respective metal line of the sixth lower metal layer LM5, and thus, the upper pad PAD1a and the plurality of lower pads PAD2a may be used as wires connecting the metal lines of the sixth lower metal layer LM5 to one another. In a fifth wiring structure 155, the plurality of upper pads PAD1a may be commonly connected to the lower pads PAD2a, where the lower pad PAD2a may be commonly connected to the metal lines of the sixth lower metal layer LM5, and thus, the plurality of upper pads PAD1a and the lower pad PAD2a may be used as wires connecting metal lines of the sixth lower metal layer LM5 to one another.

Figure 15:
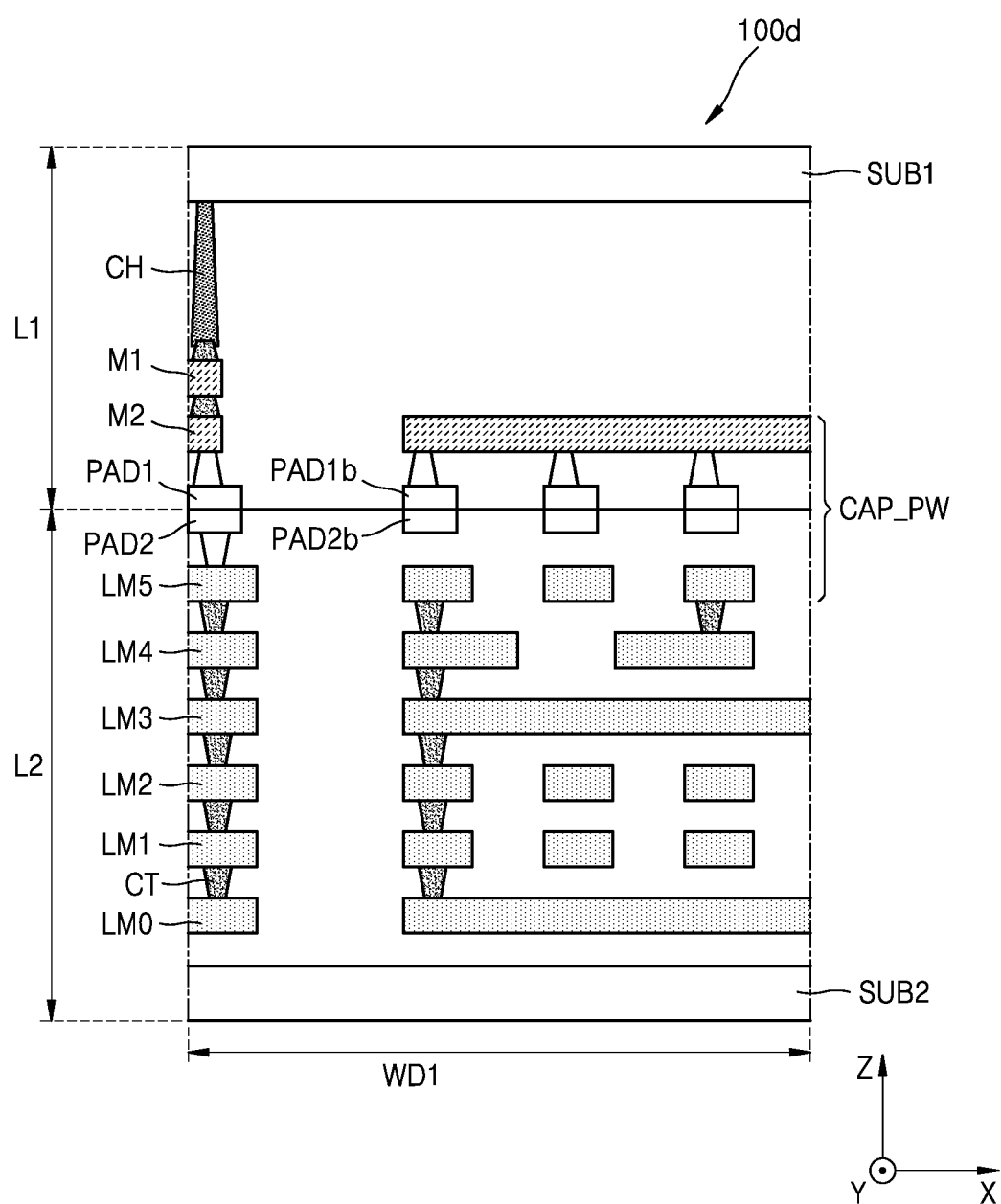

FIG. 15 is a diagram showing a memory device 100d, according to one or more embodiments.

Referring to FIG. 15, the memory device 100d may include the first semiconductor layer L1 and the second semiconductor layer L2 arranged in the vertical direction Z. For example, the first semiconductor layer L1 may be vertically stacked on the second semiconductor layer L2. The first semiconductor layer L1 may include a channel structure CH extending in the vertical direction Z, and the channel structure CH may be connected to the top bonding pad PAD1 through first and second metal layers M1 and M2. The second semiconductor layer L2 may include the first to sixth lower metal layers LM0 to LM5 sequentially arranged in the vertical direction Z and the bottom bonding pad PAD2.

The first semiconductor layer L1 may further include a plurality of upper pads PAD1b spaced apart from one another in the second direction X. The plurality of upper pads PAD1b may be commonly connected to the second upper metal layer M2 extending in the second direction X. In one or more examples, the plurality of upper pads PAD1b may not be connected to the channel structure CH or a bit line, and thus, the upper pad PAD1a may be referred to as "upper dummy pads," which may be a pad in a layer that is not used.

The second semiconductor layer L2 may further include a plurality of lower pads PAD2b spaced apart from one another in the second direction X. The plurality of lower pads PAD2b may each be connected to a respective upper pad PAD1b from the plurality of upper pads PAD1b. In one or more examples, the plurality of lower pads PAD2b may not be connected to the sixth lower metal layer LM5. Therefore, the plurality of upper pads PAD1b and the plurality of lower pads PAD2b may be capacitively coupled to the sixth lower metal layer LM5. For example, the sixth lower metal layer LM5 may correspond to a power line connected to a page buffer, and, in this case, the plurality of upper pads PAD1b and the plurality of lower pads PAD2b may be used as power capacitors CAP PW.

In this regard, the first semiconductor layer L1 may further include an upper metal layer extending in the first direction Y (e.g., the second upper metal layer M2) and the plurality of upper pads PAD1b connected to the upper metal layer. Furthermore, second semiconductor layer L2 may further include the plurality of lower pads PAD2b each connected to a respective upper PAD1b from the plurality of upper pads PAD1b, and a plurality of power lines each corresponding to a respective lower PAD2b from the plurality of lower pads PAD2b (e.g., the sixth lower metal layer LM5). Furthermore, the second upper metal layer M2, the plurality of upper pads PAD1b, and the plurality of lower pads PAD2b may be capacitively coupled to the plurality of power lines (e.g., LM5) to function as the power capacitors CAP PW.

Figure 16:
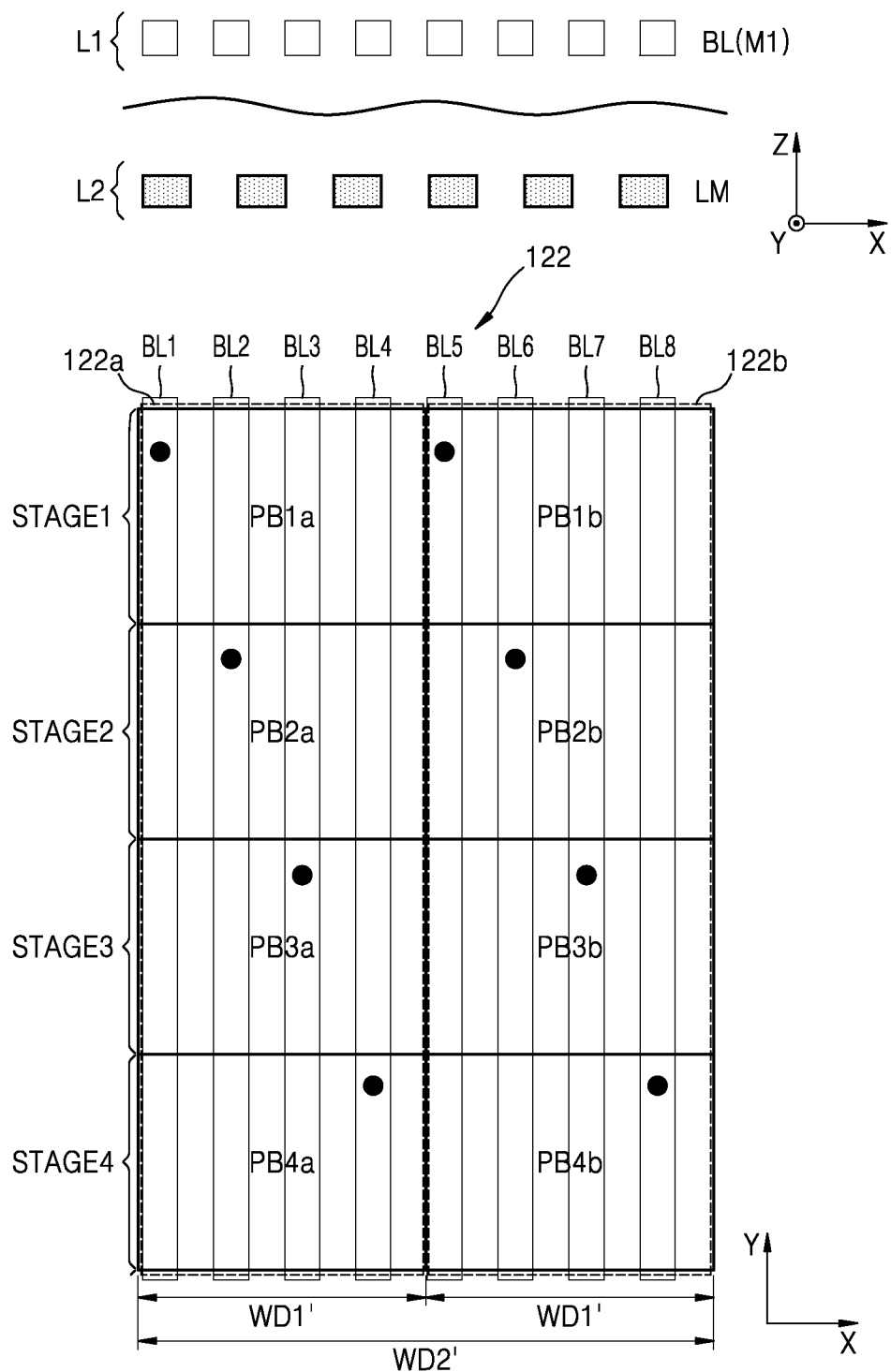
FIG. 16 is a plan view of an example of a page buffer circuit according to one or more embodiments.

FIG. 16 is a plan view of an example of a page buffer circuit 122, according to one or more embodiments.

Referring to FIG. 16, the present embodiment corresponds to a modified example of the embodiment shown in FIG. 6, and thus, redundant descriptions will be omitted. The page buffer circuit 122 may include a first page buffer column 122a and a second page buffer column 122b adjacent to each other in the second direction X. The first page buffer column 122a may include first to fourth page buffers PB1a to PB4a arranged in the first direction Y, and the second page buffer column 122b may include first to fourth page buffers PB1b to PB4b arranged in the first direction Y. Accordingly, the first page buffer column 122a and the second page buffer column 122b may each have a 4-stage structure. Therefore, the area of the page buffer circuit 122 in the first direction Y may be further advantageously reduced. Furthermore, due to the reduction of a bit line pitch, the area of the page buffer circuit 122 in the second direction X may also be advantageously reduced.

First to fourth bit lines BL1 to BL4 extending in the first direction Y and spaced apart from one another in the second direction X may be arranged above the first page buffer column 122a. For example, the first page buffer column 122a may have a first width WD1' in the second direction X, and the first width WD1' may correspond to the pitch of the first to fourth bit lines BL1 to BL4. The first to fourth page buffers PB1a to PB4a may be connected to the first to fourth bit lines BL1 to BL4, respectively.

Fifth to eighth bit lines BL5 to BL8 extending in the first direction Y and spaced apart from one another in the second direction X may be arranged above the second page buffer column 122b. For example, the second page buffer column 122b may have the first width WD1' in the second direction X, and the first width WD1' may correspond to the pitch of the fifth to eighth bit lines BL5 to BL8. The first to fourth page buffers PB to PB4b may be connected to the fifth to eighth bit lines BL5 to BL8, respectively. The total width of the first page buffer column 122a and the second page buffer column 122b may be a second width WD2' in the second direction X, where the second width WD2' may be twice the first width WD1'. For example, the second width WD2' may correspond to the pitch of first to eighth bit lines BL1 to BL8.

Figure 17:
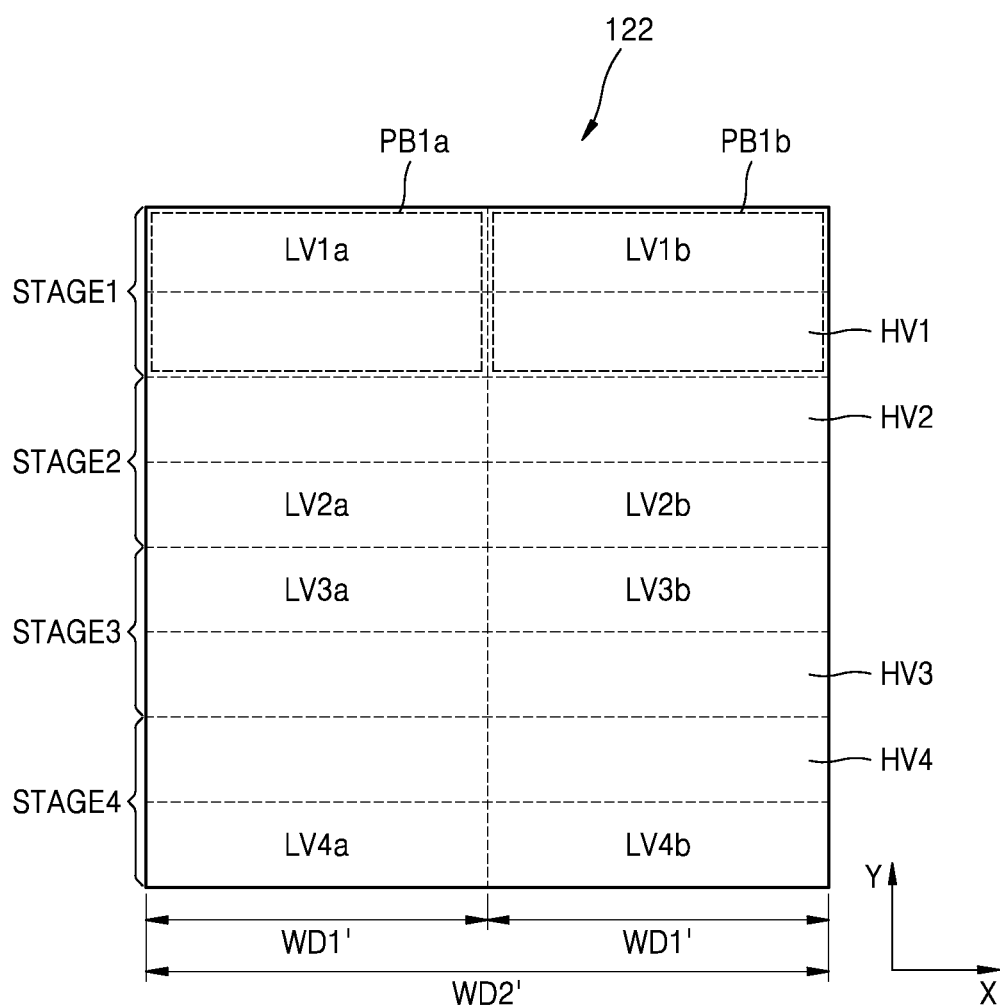
FIG. 17 is a plan view of the page buffer circuit of FIG. 16 according to one or more embodiments in more detail.

FIG. 17 is a plan view of the page buffer circuit 122 of FIG. 16, according to one or more embodiments in more detail.

Referring to FIGS. 16 and 17, the present embodiment corresponds to a modified example of the embodiment shown in FIG. 7, and thus, redundant descriptions will be omitted. The page buffer circuit 122 may have a 4-stage structure. The first stage STAGE1 may include the first low voltage region LV1a, the second low voltage region LV1b, and the high voltage region HV1. Each of the first low voltage region LV1a and the second low voltage region LV1b has the first width WD1' in the second direction X, and the first low voltage region LV1a and the second low voltage region LV1b are adjacent to each other in the second direction X. The high voltage region HV1 has the second width WD2' in the second direction X and is adjacent to the first low voltage region LV1a and the second low voltage region LV1b in the first direction Y. The first width WD1' may correspond to the pitch of four bit lines, and the second width WD2' may correspond to the pitch of eight bit lines. Here, the first low voltage region LV1a and a portion of the high voltage region HV1 may constitute the first page buffer PB1a of the first page buffer column 122a, and the second low voltage region LV1b and the remaining of the high voltage region HV1 may constitute the first page buffer PB1b of the second page buffer column 122b.

The second stage STAGE2 may include the high voltage region HV2 adjacent to the high voltage region HV1 in the first direction Y and the first low voltage region LV2a and the second low voltage region LV2b adjacent to each other in the second direction X. The third stage STAGE3 includes the first low voltage region LV3a adjacent to the first low voltage region LV2a in the first direction Y, the second low voltage region LV3b adjacent to the second low voltage region LV2b in the first direction Y, and the high voltage region HV3. The fourth stage STAGE4 may include the high voltage region HV4 adjacent to the high voltage region HV3 in the first direction Y and the first low voltage region LV4a and the second low voltage region LV4b adjacent to each other in the second direction X.

Figure 18:
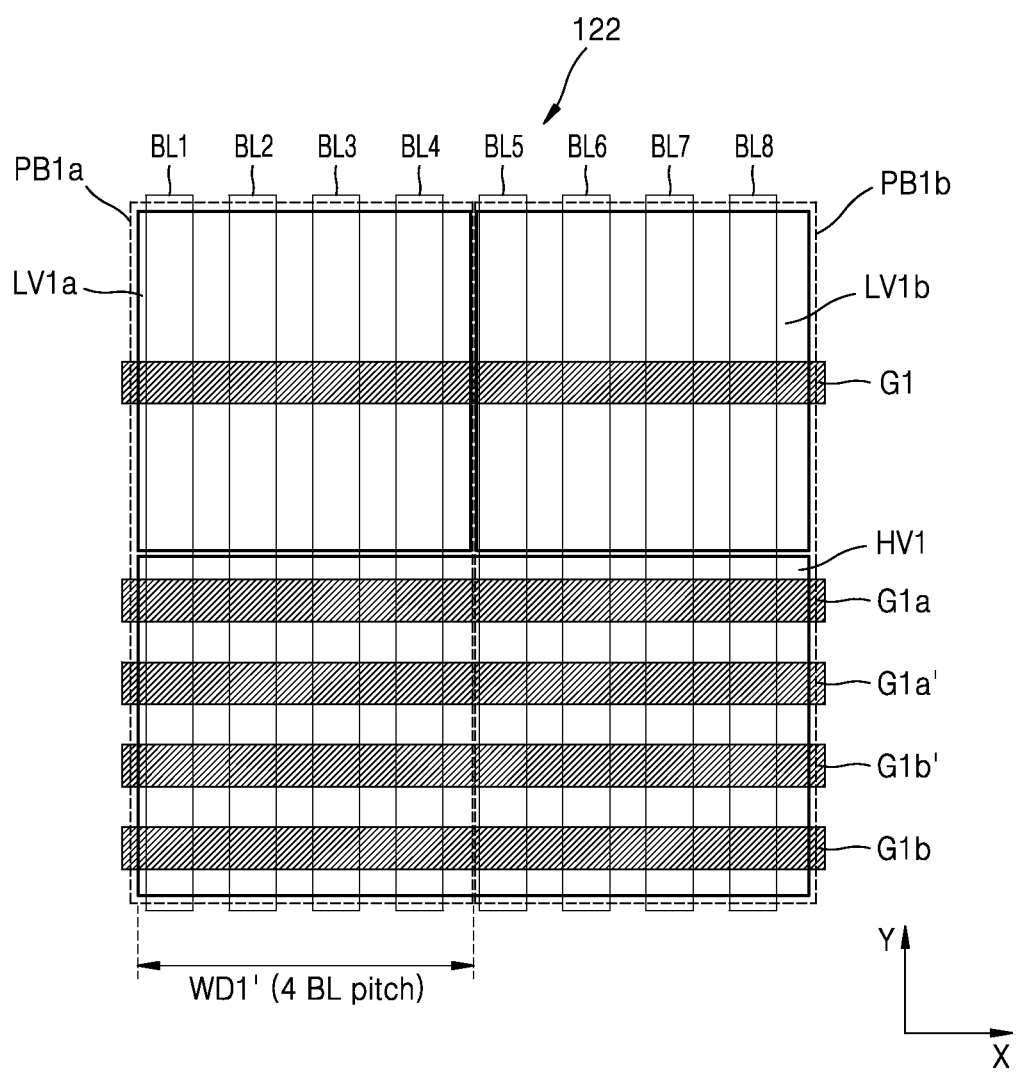
FIG. 18 is a plan view of first page buffers of the page buffer circuit of FIG. 17 according to one or more embodiments in more detail.

FIG. 18 is a plan view of the first page buffers PB1a and PB1b of the page buffer circuit 122 of FIG. 17, according to one or more embodiments in more detail.

Referring to FIG. 18, the present embodiment corresponds to a modified example of the embodiment shown in FIG. 8, and thus, redundant descriptions will be omitted. The first page buffer PB1a may include the first low voltage region LV1a and a portion of the high voltage region HV1, and the first page buffer PB1b may include the second low voltage region LV1b and the rest of the high voltage region HV1. The gates G extending in the second direction X may be arranged in the first low voltage region LV1a and the second low voltage region LV1b. The first gates G1a and G1a' extending in the second direction X may be arranged in the high voltage region HV1. For example, the first gates G1a and G1a' may be included in the first page buffer PB1a. Furthermore, the second gates G1b and G1b' extending in the second direction X may be further arranged in the high voltage region HV1. For example, the second gates G1b and G1b' may be included in the first page buffer PB1b.

FIG. 19 is a cross-sectional view of a memory device 100e, according to one or more embodiments.

Referring to FIG. 19, the present embodiment corresponds to a modified example of the embodiment shown in FIG. 11a, and thus, redundant descriptions will be omitted. The first semiconductor layer L1 may further include the channel structures CH each extending in the vertical direction Z from the upper substrate SUB1. The first upper metal layer M1 and the second upper metal layer M2 may be arranged above the channel structures CH. For example, the first upper metal layer M1 and the second upper metal layer M2 may extend in the first direction Y. The second semiconductor layer L2 may include the first to sixth lower metal layers LM0 to LM5 sequentially arranged over the lower substrate SUB2 in the vertical direction Z. For example, the second, third, fifth, and sixth lower metal layers LM1, LM2, LM4, and LM5 may extend in the first direction Y, and the first and fourth lower metal layers LM0 and LM3 may extend in the second direction X. However, the present disclosure is not limited thereto, and the first lower metal layer LM0 or the fourth lower metal layer LM3 may extend in an oblique direction with respect to the first direction Y.

In one or more examples, in a region corresponding to the first width WD1', the second lower metal layer LM1 may include three metal lines, and the third lower metal layer LM2 may also include three metal lines. However, the present disclosure is not limited thereto. Furthermore, in a region corresponding to the first width WD1', the fifth lower metal layer LM4 may include two metal lines, and the sixth lower metal layer LM5 may also include two metal lines. However, the present disclosure is not limited thereto.

According to some embodiments, in a region corresponding to the first width WD1', the second lower metal layer LM1 may include four metal lines, and the third lower metal layer LM2 may also include four metal lines. For example, within a unit width or a page buffer unit width, four lower metal lines may be arranged at the same level. For example, the pitch of lower metal lines may be reduced through the application of EUV equipment, and thus, four or more lower metal lines may be arranged at the same level within a unit width or a page buffer unit width. In one or more examples, four lower metal lines may be used as a first power line, a second power line, a sensing node, and a signal line, respectively.

One or more embodiments in which the page buffer circuit 122 has a 4-stage structure has been exemplified above with reference to FIGS. 16 to 19. Various embodiments described above with reference to FIGS. 9 to 15 may also be applied to one or more embodiments in which the page buffer circuit 122 has a 4-stage structure, and redundant descriptions will be omitted. According to one or more embodiments, the 4-stage structure of the page buffer circuit 122 may be applied to a memory device having a COP structure. According to one or more embodiments, the 4-stage structure of the page buffer circuit 122 may be applied to a memory device having a B-VNAND structure.

FIG. 20 is a view illustrating a memory device 500, according to some embodiments of the present disclosure.

Referring to FIG. 20, the memory device 500 may have a chip-to-chip (C2C) structure. According to one or more embodiments, at least one upper chip including a cell region and a lower chip including a peripheral circuit region PERI may be manufactured separately. After these components are separately manufactured, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. In one or more embodiments, the bonding metal patterns may be formed of aluminum (Al) or tungsten (W).

The memory device 500 may include the at least one upper chip including the cell region. For example, as illustrated in FIG. 20, the memory device 500 may include two upper chips. However, the number of the upper chips is not limited thereto. In the case in which the memory device 500 includes the two upper chips, a first upper chip including a first cell region CELL1, a second upper chip including a second cell region CELL2 and the lower chip including the peripheral circuit region PERI may be manufactured separately. After these components are separately manufactured, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 20. However, embodiments of the present disclosures are not limited thereto. In one or more embodiments, one of the first upper chip and the second upper chip may be turned over and then may be connected to a corresponding chip by the bonding method.

According to one or more embodiments, each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 210 and a plurality of circuit elements 220a, 220b and 220c formed on the first substrate 210. An interlayer insulating layer 215 including one or more insulating layers may be provided on the plurality of circuit elements 220a, 220b and 220c, and a plurality of metal lines electrically connected to the plurality of circuit elements 220a, 220b and 220c may be provided in the interlayer insulating layer 215. For example, the plurality of metal lines may include first metal lines 230a, 230b and 230c connected to the plurality of circuit elements 220a, 220b and 220c, and second metal lines 240a, 240b and 240c formed on the first metal lines 230a, 230b and 230c. The plurality of metal lines may be formed of at least one of various conductive materials. For example, the first metal lines 230a, 230b and 230c may be formed of tungsten having a relatively high electrical resistivity, and the second metal lines 240a, 240b and 240c may be formed of copper having a relatively low electrical resistivity.

The first metal lines 230a, 230b and 230c and the second metal lines 240a, 240b and 240c are illustrated and described in the present embodiments. However, embodiments of the present disclosures are not limited thereto. In one or more embodiments, at least one or more additional metal lines may further be formed on the second metal lines 240a, 240b and 240c. In this case, the second metal lines 240a, 240b and 240c may be formed of aluminum, and at least some of the additional metal lines formed on the second metal lines 240a, 240b and 240c may be formed of copper having an electrical resistivity lower than that of aluminum of the second metal lines 240a, 240b and 240c.

The interlayer insulating layer 215 may be disposed on the first substrate 210 and may include an insulating material such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (331 to 338) may be stacked on the second substrate 310 in a direction (e.g., the Z-axis direction) perpendicular to a top surface of the second substrate 310. String selection lines and a ground selection line may be disposed on and under the word lines 330, and the plurality of word lines 330 may be disposed between the string selection lines and the ground selection line. In one or more examples, the second cell region CELL2 may include a third substrate 410 and a common source line 420, and a plurality of word lines 430 (431 to 438) may be stacked on the third substrate 410 in a direction (e.g., the Z-axis direction) perpendicular to a top surface of the third substrate 410. Each of the second substrate 310 and the third substrate 410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some embodiments, as illustrated in a region 'A1', the channel structure CH may be provided in the bit line bonding region BLBA and may extend in the direction perpendicular to the top surface of the second substrate 310 to penetrate the word lines 330, the string selection lines, and the ground selection line. The channel structure CH may include a data storage layer, a channel layer, and a filling insulation layer. The channel layer may be electrically connected to a first metal line 350c and a second metal line 360c in the bit line bonding region BLBA. For example, the second metal line 360c may be a bit line and may be connected to the channel structure CH through the first metal line 350c. The bit line 360c may extend in a first direction (e.g., a Y-axis direction) parallel to the top surface of the second substrate 310. The channel layer may be electrically connected to a first metal line 450c and a second metal line 460c in the bit line bonding region BLBA.

In some embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 310 to penetrate the common source line 320 and lower word lines 331 and 332. The lower channel LCH may include a data storage layer, a channel layer, and a filling insulation layer and may be connected to the upper channel UCH. The upper channel UCH may penetrate upper word lines 333 to 338. The upper channel UCH may include a data storage layer, a channel layer, and a filling insulation layer, and the channel layer of the upper channel UCH may be electrically connected to the first metal line 350c and the second metal line 360c. As a length of a channel increases, due to characteristics of manufacturing processes, it may be difficult to form a channel having a substantially uniform width. The memory device 500 according to the present embodiments may include a channel having improved width uniformity due to the lower channel LCH and the upper channel UCH which are formed by the processes performed sequentially. For example, the lower channel LCH may be formed first with the upper channel UCH being subsequently formed and vertically stacked on the lower channel LCH.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 332 and 333 adjacent to the boundary between the lower channel LCH and the upper channel UCH may be the dummy word lines. In this case, data may not be stored in memory cells connected to the dummy word line. In one or more examples, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus, it is possible to reduce an influence of a non-uniform channel width between the lower and upper channels LCH and UCH on an operation of the memory device.

In one or more examples, the number of the lower word lines 331 and 332 penetrated by the lower channel LCH is less than the number of the upper word lines 333 to 338 penetrated by the upper channel UCH in the region 'A2'. However, embodiments of the present disclosures are not limited thereto. In one or more embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 20, the first through-electrode THV1 may penetrate the common source line 320 and the plurality of word lines 330. In one or more embodiments, the first through-electrode THV1 may further penetrate the second substrate 310. The first through-electrode THV1 may include a conductive material. In one or more embodiments, the first through-electrode THV1 may include a conductive material surrounded by an insulating material. The second through-electrode THV2 may have the same shape and structure as the first through-electrode THV1.

In some embodiments, the first through-electrode THV1 and the second through-electrode THV2 may be electrically connected to each other through a first through-metal pattern 372d and a second through-metal pattern 472d. The first through-metal pattern 372d may be formed at a bottom end of the first upper chip including the first cell region CELL1, and the second through-metal pattern 472d may be formed at a top end of the second upper chip including the second cell region CELL2. The first through-electrode THV1 may be electrically connected to the first metal line 350c and the second metal line 360c. The second through-electrode THV2 may be electrically connected to the first metal line 450c and the second metal line 460c. A lower via 371d may be formed between the first through-electrode THV1 and the first through-metal pattern 372d, and an upper via 471d may be formed between the second through-electrode THV2 and the second through-metal pattern 472d. The first through-metal pattern 372d and the second through-metal pattern 472d may be connected to each other by the bonding method.

In addition, in the bit line bonding region BLBA, an upper metal pattern 252 may be formed in an uppermost metal layer of the peripheral circuit region PERI, and an upper metal pattern 392 having the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by the bonding method. In the bit line bonding region BLBA, the bit line 360c may be electrically connected to a page buffer included in the peripheral circuit region PERI. For example, some of the circuit elements 220c of the peripheral circuit region PERI may constitute the page buffer, and the bit line 360c may be electrically connected to the circuit elements 220c constituting the page buffer through an upper bonding metal pattern 370c of the first cell region CELL1 and an upper bonding metal pattern 270c of the peripheral circuit region PERI.

Referring continuously to FIG. 20, in the word line bonding region WLBA, the word lines 330 of the first cell region CELL1 may extend in a second direction (e.g., an X-axis direction) parallel to the top surface of the second substrate 310 and may be connected to a plurality of cell contact plugs 340 (341 to 347). First metal lines 350b and second metal lines 360b may be sequentially connected onto the cell contact plugs 340 connected to the word lines 330. In the word line bonding region WLBA, the cell contact plugs 340 may be connected to the peripheral circuit region PERI through upper bonding metal patterns 370b of the first cell region CELL1 and upper bonding metal patterns 270b of the peripheral circuit region PERI.

The cell contact plugs 340 may be electrically connected to a row decoder included in the peripheral circuit region PERI. For example, some of the circuit elements 220b of the peripheral circuit region PERI may constitute the row decoder, and the cell contact plugs 340 may be electrically connected to the circuit elements 220b constituting the row decoder through the upper bonding metal patterns 370b of the first cell region CELL1 and the upper bonding metal patterns 270b of the peripheral circuit region PERI. In some embodiments, an operating voltage of the circuit elements 220b constituting the row decoder may be different from an operating voltage of the circuit elements 220c constituting the page buffer. For example, the operating voltage of the circuit elements 220c constituting the page buffer may be greater than the operating voltage of the circuit elements 220b constituting the row decoder.

In one or more examples, in the word line bonding region WLBA, the word lines 430 of the second cell region CELL2 may extend in the second direction (e.g., the X-axis direction) parallel to the top surface of the third substrate 410 and may be connected to a plurality of cell contact plugs 440 (441 to 447). The cell contact plugs 440 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 370b may be formed in the first cell region CELL1, and the upper bonding metal patterns 270b may be formed in the peripheral circuit region PERI. The upper bonding metal patterns 370b of the first cell region CELL1 and the upper bonding metal patterns 270b of the peripheral circuit region PERI may be electrically connected to each other by the bonding method. The upper bonding metal patterns 370b and the upper bonding metal patterns 270b may be formed of aluminum, copper, or tungsten.

In the external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected to each other by the bonding method in the external pad bonding region PA. In one or more examples, an upper metal pattern 372a may be formed in an upper portion of the first cell region CELL1, and an upper metal pattern 272a may be formed in an upper portion of the peripheral circuit region PERI. The upper metal pattern 372a of the first cell region CELL1 and the upper metal pattern 272a of the peripheral circuit region PERI may be connected to each other by the bonding method.

Common source line contact plugs 380 and 480 may be disposed in the external pad bonding region PA. The common source line contact plugs 380 and 480 may be formed of a conductive material such as a metal, a metal compound, and/or doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350a and a second metal line 360a may be sequentially stacked on the common source line contact plug 380 of the first cell region CELL1, and a first metal line 450a and a second metal line 460a may be sequentially stacked on the common source line contact plug 480 of the second cell region CELL2.

Input/output pads 205, 405 and 406 may be disposed in the external pad bonding region PA. Referring to FIG. 20, a lower insulating layer 201 may cover a bottom surface of the first substrate 210, and a first input/output pad 205 may be formed on the lower insulating layer 201. The first input/output pad 205 may be connected to at least one of a plurality of the circuit elements 220a disposed in the peripheral circuit region PERI through a first input/output contact plug 203 and may be separated from the first substrate 210 by the lower insulating layer 201. Furthermore, a side insulating layer may be disposed between the first input/output contact plug 203 and the first substrate 210 to electrically isolate the first input/output contact plug 203 from the first substrate 210.

An upper insulating layer 401 covering a top surface of the third substrate 410 may be formed on the third substrate 410. A second input/output pad 405 and/or a third input/output pad 406 may be disposed on the upper insulating layer 401. The second input/output pad 405 may be connected to at least one of the plurality of circuit elements 220*a* disposed in the peripheral circuit region PERI through second input/output contact plugs 403 and 303, and the third input/output pad 406 may be connected to at least one of the plurality of circuit elements 220*a* disposed in the peripheral circuit region PERI through third input/output contact plugs 404 and 304.

In some embodiments, the third substrate 410 may not be disposed in a region in which the input/output contact plug is disposed. For example, as illustrated in a region 'B', the third input/output contact plug 404 may be separated from the third substrate 410 in a direction parallel to the top surface of the third substrate 410 and may penetrate an interlayer insulating layer 415 of the second cell region CELL2 so as to be connected to the third input/output pad 406. In this case, the third input/output contact plug 404 may be formed by at least one of various processes.

In some embodiments, as illustrated in a region 'B1', the third input/output contact plug 404 may extend in a third direction (e.g., the Z-axis direction), and a diameter of the third input/output contact plug 404 may become progressively greater toward the upper insulating layer 401. For example, a diameter of the channel structure CH described in the region 'A1' may become progressively less toward the upper insulating layer 401, but the diameter of the third input/output contact plug 404 may become progressively greater toward the upper insulating layer 401. For example, the third input/output contact plug 404 may be formed after the second cell region CELL2 and the first cell region CELL1 are bonded to each other by the bonding method.

In one or more embodiments, as illustrated in a region 132', the third input/output contact plug 404 may extend in the third direction (e.g., the Z-axis direction), and a diameter of the third input/output contact plug 404 may become progressively less toward the upper insulating layer 401. For example, like the channel structure CH, the diameter of the third input/output contact plug 404 may become progressively less toward the upper insulating layer 401. For example, the third input/output contact plug 404 may be formed together with the cell contact plugs 440 before the second cell region CELL2 and the first cell region CELL1 are bonded to each other.

In one or more embodiments, the input/output contact plug may overlap with the third substrate 410. For example, as illustrated in a region 'C', the second input/output contact plug 403 may penetrate the interlayer insulating layer 415 of the second cell region CELL2 in the third direction (e.g., the Z-axis direction) and may be electrically connected to the second input/output pad 405 through the third substrate 410. In this case, a connection structure of the second input/output contact plug 403 and the second input/output pad 405 may be realized by various methods.

In some embodiments, as illustrated in a region 'C1', an opening 408 may be formed to penetrate the third substrate 410, and the second input/output contact plug 403 may be connected directly to the second input/output pad 405 through the opening 408 formed in the third substrate 410. In this case, as illustrated in the region 'C1', a diameter of the second input/output contact plug 403 may become progressively greater toward the second input/output pad 405. However, embodiments of the present disclosures are not limited thereto, and in one or more embodiments, the diameter of the second input/output contact plug 403 may become progressively less toward the second input/output pad 405.

In one or more embodiments, as illustrated in a region 'C2', the opening 408 penetrating the third substrate 410 may be formed, and a contact 407 may be formed in the opening 408. An end of the contact 407 may be connected to the second input/output pad 405, and another end of the contact 407 may be connected to the second input/output contact plug 403. Thus, the second input/output contact plug 403 may be electrically connected to the second input/output pad 405 through the contact 407 in the opening 408. In this case, as illustrated in the region 'C2', a diameter of the contact 407 may become progressively greater toward the second input/output pad 405, and a diameter of the second input/output contact plug 403 may become progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In one or more embodiments illustrated in a region 'C3', a stopper 409 may further be formed on a bottom end of the opening 408 of the third substrate 410, as compared with the embodiments of the region 'C2'. The stopper 409 may be a metal line formed in the same layer as the common source line 420. In one or more embodiments, the stopper 409 may be a metal line formed in the same layer as at least one of the word lines 430. The second input/output contact plug 403 may be electrically connected to the second input/output pad 405 through the contact 407 and the stopper 409.

Like the second and third input/output contact plugs 403 and 404 of the second cell region CELL2, a diameter of each of the second and third input/output contact plugs 303 and 304 of the first cell region CELL1 may become progressively less toward the lower metal pattern 371*e* or may become progressively greater toward the lower metal pattern 371*e*.

In some embodiments, a slit 411 may be formed in the third substrate 410. For example, the slit 411 may be formed at a certain position of the external pad bonding region PA. For example, as illustrated in a region 'D', the slit 411 may be located between the second input/output pad 405 and the cell contact plugs 440 when viewed in a plan view. In one or more embodiments, the second input/output pad 405 may be located between the slit 411 and the cell contact plugs 440 when viewed in a plan view.

In some embodiments, as illustrated in a region 'D1', the slit 411 may be formed to penetrate the third substrate 410. For example, the slit 411 may be used to prevent the third substrate 410 from being finely cracked when the opening 408 is formed. However, embodiments of the present disclosures are not limited thereto, and in one or more embodiments, the slit 411 may be formed to have a depth ranging from about 60% to about 70% of a thickness of the third substrate 410.

In one or more embodiments, as illustrated in a region 'D2', a conductive material 412 may be formed in the slit 411. For example, the conductive material 412 may be used to discharge a leakage current occurring in driving of the circuit elements in the external pad bonding region PA to the outside. In this case, the conductive material 412 may be connected to an external ground line.

In one or more embodiments, as illustrated in a region 'D3', an insulating material 413 may be formed in the slit 411. For example, the insulating material 413 may be used to electrically isolate the second input/output pad 405 and the second input/output contact plug 403 disposed in the external pad bonding region PA from the word line bonding region WLBA. Since the insulating material 413 is formed in the slit 411, it is possible to prevent a voltage provided through the second input/output pad 405 from affecting a metal layer disposed on the third substrate 410 in the word line bonding region WLBA.

In one or more embodiments, the first to third input/output pads 205, 405 and 406 may be selectively formed. For example, the memory device 500 may be realized to include only the first input/output pad 205 disposed on the first substrate 210, to include only the second input/output pad 405 disposed on the third substrate 410, or to include only the third input/output pad 406 disposed on the upper insulating layer 401.

In some embodiments, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1. After removal of the second substrate 310, an insulating layer covering a top surface of the common source line 320 or a conductive layer for connection may be formed. In one or more examples, the third substrate 410 of the second cell region CELL2 may be removed before or after the bonding process of the first cell region CELL1 and the second cell region CELL2. After removal of the third substrate 410, the upper insulating layer 401 covering a top surface of the common source line 420 or a conductive layer for connection may be formed.

Figure 21:
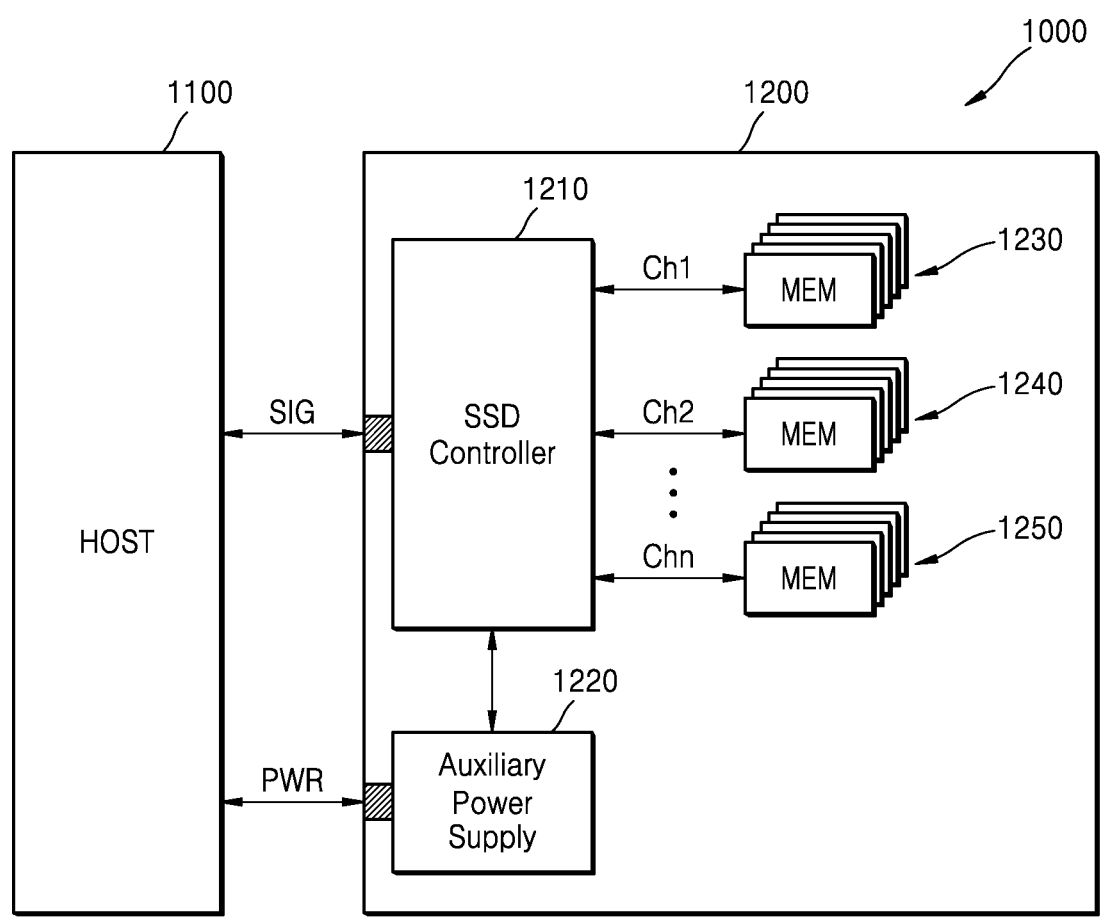
FIG. 21 is a diagram showing a solid state drive (SSD) including a memory device according to one or more embodiments.

FIG. 21 is a block diagram showing an example in which a memory device, according one or more embodiments, is applied to a solid state drive (SSD) system 1000.

Referring to FIG. 21, the SSD system 1000 may include a host 1100 and an SSD 1200. The SSD 1200 exchanges signals with the host 1100 through a signal connector and receives power through a power connector. The SSD 1200 may include an SSD controller 1210, an auxiliary power supply device 1220, and a plurality of memory devices 1230, 1240, and 1250. The memory devices 1230, 1240, and 1250 may be vertically stacked NAND flash memory devices. In one or more examples, the SSD 1200 may be implemented according to the embodiments described above with reference to FIGS. 1 to 20.

While the present disclosure has been particularly shown and described with reference one or more embodiments thereof, it will be understood that various changes in form and details may be made therein without departing from the spirit and scope of the following claims.

What is claimed is:

1. A non-volatile memory device comprising:
    a memory cell array comprising a plurality of memory cells in which each memory cell is connected to a respective bit line from a plurality of bit lines that extend in a first direction, and comprise first to twelfth bit lines arranged in a second direction different from the first direction; and
    a page buffer circuit disposed below the memory cell array in a vertical direction different from the first direction and the second direction and having a multi-stage structure in the first direction,
    wherein a stage of the multi-stage structure comprises:
        a high voltage region comprising a first high voltage transistor connected to one of first to sixth bit lines from the plurality of bit lines and a second high voltage transistor connected to one of seventh to twelfth bit lines from the plurality of bit lines,
        a first low voltage region adjacent to the high voltage region in the first direction, and the first low voltage region comprising a first transistor connected to the first high voltage transistor, and
        a second low voltage region adjacent to the high voltage region in the first direction and adjacent to the first low voltage region in the second direction, and the second low voltage region comprising a second transistor connected to the second high voltage transistor,
    wherein each of the first low voltage region and the second low voltage region has a first width corresponding to a pitch of six bit lines in the second direction, and
    wherein the high voltage region has a second width corresponding to a pitch of twelve bit lines in the second direction.

2. The non-volatile memory device of claim 1, wherein the memory cell array is disposed in a first semiconductor layer,
    wherein the page buffer circuit is disposed in a second semiconductor layer,
    wherein the second semiconductor layer further comprises a first metal layer comprising a first set of metal lines connected to the page buffer circuit and extending in the first direction, and
    wherein the first set of metal lines comprises a first metal line, a second metal line, and a third metal line arranged adjacent to one another in the second direction above the first low voltage region and the high voltage region.

3. The non-volatile memory device of claim 2, wherein the first metal line is connected to a drain of the first transistor,
    wherein the second metal line is connected to a source of the first transistor, and
    wherein the third metal line is connected to a gate of the first transistor.

4. The non-volatile memory device of claim 3, wherein the second semiconductor layer further comprises a lower metal layer between the first metal layer and the first transistor,
    wherein the lower metal layer comprises:
        a first metal pattern connecting the first metal line to the drain of the first transistor,
        a second metal pattern connecting the third metal line to the gate of the first transistor, and
        a third metal pattern connecting the second metal line to the source of the first transistor, and
    wherein the first metal pattern, the second metal pattern, and the third metal pattern are arranged adjacent to one another in the first direction.

5. The non-volatile memory device of claim 2, wherein the second semiconductor layer further comprises a second metal layer comprising a second set of metal lines arranged adjacent to the first metal layer in the vertical direction and extending in the first direction, and
    wherein the second set of metal lines comprises a fourth metal line, a fifth metal line, and a sixth metal line arranged adjacent to one another in the second direction above the first low voltage region and the high voltage region.

6. The non-volatile memory device of claim 5, wherein a first power voltage is applied to the first metal line,
wherein a second power voltage is applied to the third metal line,
wherein the second metal line between the first metal line and the third metal line is connected to a sensing node,
wherein a first internal signal is applied to the fourth metal line,
wherein a second internal signal is applied to the sixth metal line, and
wherein a third power voltage is applied to the fifth metal line between the fourth metal line and the sixth metal line.

7. The non-volatile memory device of claim 5, wherein one of the first metal line, the second metal line, and the third metal line is connected to a sensing node, and
wherein one of the fourth metal line, the fifth metal line, and the sixth metal line is connected to the sensing node.

8. The non-volatile memory device of claim 2, wherein the first set of metal lines further comprise a fourth metal line extending in the first direction above the first low voltage region and the high voltage region, and
wherein the first metal line, the second metal line, the third metal line, and the fourth metal line are used as a first power line, a second power line, a sensing node, and an internal signal line, respectively.

9. The non-volatile memory device of claim 2, wherein the first semiconductor layer further comprises a plurality of top bonding pads in which each top bonding pad is connected to a respective bit line from the plurality of bit lines,
wherein the second semiconductor layer further comprises a plurality of bottom bonding pads in which each bottom bonding pad is connected to a respective top bonding pad from the plurality of top bonding pads, and
wherein each bottom bonding pad from the plurality of bottom bonding pads is connected to a respective page buffer from a plurality of page buffers of the page buffer circuit.

10. The non-volatile memory device of claim 1, wherein the first high voltage transistor corresponds to a first bit line select transistor,
wherein the second high voltage transistor corresponds to a second bit line select transistor,
wherein the first transistor corresponds to a first bit line shut-off transistor, and
wherein the second transistor corresponds to a second bit line shut-off transistor.

11. A non-volatile memory device comprising:
a memory cell array comprising a plurality of memory cells in which each memory cell is connected to a respective bit line from a plurality of bit lines that extend in a first direction and comprises first to eighth bit lines arranged in a second direction different from the first direction; and
a page buffer circuit disposed below the memory cell array in a vertical direction different from the first direction and the second direction and having a multi-stage structure in the first direction,
wherein a stage of the multi-stage structure comprises:
a high voltage region comprising a first high voltage transistor connected to one of first to fourth bit lines from the plurality of bit lines and a second high voltage transistor connected to one of fifth to eighth bit lines from the plurality of bit lines;
a first low voltage region adjacent to the high voltage region in the first direction, and the first low voltage region comprising a first transistor connected to the first high voltage transistor, and
a second low voltage region adjacent to the high voltage region in the first direction and adjacent to the first low voltage region in the second direction, and the second low voltage region comprising a second transistor connected to the second high voltage transistor,
wherein each of the first low voltage region and the second low voltage regions has a first width corresponding to a pitch of four bit lines in the second direction, and
wherein the high voltage region has a second width corresponding to a pitch of eight bit lines in the second direction.

12. The non-volatile memory device of claim 11, wherein the memory cell array is disposed in a first semiconductor layer,
wherein the page buffer circuit is disposed in a second semiconductor layer,
wherein the second semiconductor layer further comprises a first metal layer comprising a first set of metal lines connected to the page buffer circuit and each extending in the first direction, and
wherein the first set of metal lines comprises a first metal line, a second metal line, and a third metal line arranged adjacent to one another in the second direction above the first low voltage region and the high voltage region.

13. The non-volatile memory device of claim 12, wherein the first metal line is connected to a drain of the first transistor,
wherein the second metal line is connected to a source of the first transistor, and
wherein the third metal line is connected to a gate of the first transistor.

14. The non-volatile memory device of claim 13, wherein the second semiconductor layer further comprises a lower metal layer between the first metal layer and the first transistor,
wherein the lower metal layer comprises:
a first metal pattern connecting the first metal line to the drain of the first transistor,
a second metal pattern connecting the third metal line to the gate of the first transistor, and
a third metal pattern connecting the second metal line to the source of the first transistor, and
wherein the first metal pattern, the second metal pattern, and the third metal pattern are arranged adjacent to one another in the first direction.

15. The non-volatile memory device of claim 12, wherein the second semiconductor layer further comprises a second metal layer comprising a second set of metal lines arranged adjacent to the first metal layer in the vertical direction, and each extending in the first direction, and
wherein the second set of metal lines comprises a fourth metal line, a fifth metal line, and a sixth metal line arranged adjacent to one another in the second direction above the first low voltage region and the high voltage region.

16. A non-volatile memory device comprising:
a first semiconductor layer comprising channel structures extending in a vertical direction, a plurality of bit lines connected to the channel structures and extending in a first direction, and a plurality of top bonding pads in which each top bonding pad is connected to a respective bit line from the plurality of bit lines; and a second semiconductor layer comprising a plurality of bottom bonding pads and a page buffer circuit that has a multi-stage structure in the first direction and is connected to the first semiconductor layer in the vertical direction through the plurality of bottom bonding pads and the plurality of top bonding pads, wherein a stage of the multi-stage structure comprises:

a high voltage region comprising a first high voltage transistor connected to one of the plurality of bit lines and a second high voltage transistor connected to another one of the plurality of bit lines, a first low voltage region adjacent to the high voltage region in the first direction, and the first low voltage region comprising a first transistor connected to the first high voltage transistor, and a second low voltage region adjacent to the high voltage region in the first direction and adjacent to the first low voltage region in a second direction, and the second low voltage region comprising a second transistor connected to the second high voltage transistor, wherein the second direction is different from the first direction, wherein each of the first low voltage region and the second low voltage region has a first width in the second direction, and wherein the high voltage region has a second width twice the first width in the second direction.

17. The non-volatile memory device of claim 16, wherein the second semiconductor layer further comprises a first metal layer comprising a first set of metal lines connected to the page buffer circuit and extending in the first direction, and wherein the first set of metal lines comprises a first metal line, a second metal line, and a third metal line arranged adjacent to one another in the second direction above the first low voltage region and the high voltage region.

18. The non-volatile memory device of claim 17, wherein the second semiconductor layer further comprises a second metal layer disposed above the first metal layer and comprising a second set of metal lines extending in the first direction, and wherein the second set of metal lines comprises a fourth metal line, a fifth metal line, and a sixth metal line arranged adjacent to one another in the second direction above the first low voltage region and the high voltage region.

19. The non-volatile memory device of claim 16, wherein the second semiconductor layer further comprises:

a lower pad, and a metal layer comprising at least two metal lines commonly connected to the lower pad, and the lower pad and the at least two metal lines are used as wires connected to a peripheral circuit disposed in the second semiconductor layer or internal wires of the peripheral circuit.

20. The non-volatile memory device of claim 16, wherein the first semiconductor layer further comprises:

an upper metal layer extending in the second direction, and a plurality of upper pads connected to the upper metal layer, the second semiconductor layer further comprises:

a plurality of lower pads in which each lower pad is connected to a respective upper pad from the plurality of upper pads, and a plurality of power lines in which each power line corresponds to a respective lower pad from the plurality of lower pads, and the upper metal layer, the plurality of upper pads, and the plurality of lower pads are capacitively coupled to the plurality of power lines to function as power capacitors.

\* \* \* \* \*